(12) United States Patent
Ohshima et al.

(10) Patent No.: US 6,625,327 B1
(45) Date of Patent: Sep. 23, 2003

(54) METHOD AND APPARATUS OF IMAGE PROCESSING CAPABLE OF GRADATION REDUCING PROCESS WITH HIGH IMAGE QUALITY

(75) Inventors: Seiji Ohshima, Itami (JP); Toshitsugu Yamamoto, Takatsuki (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/399,180

(22) Filed: Sep. 20, 1999

(30) Foreign Application Priority Data

| Sep. 24, 1998 | (JP) | 10-288834 |
| Aug. 24, 1999 | (JP) | 11-237492 |
| Jul. 14, 1999 | (JP) | 11-200249 |

(51) Int. Cl.$^7$ ................................. G06K 9/38
(52) U.S. Cl. ............... 382/270; 382/252; 358/3.22; 358/466
(58) Field of Search ................ 382/162, 167, 382/169, 172, 358, 270, 272, 252; 358/445, 465, 466, 3.16, 1.2, 3.1, 3.08, 3.22, 3.21

(56) References Cited

U.S. PATENT DOCUMENTS

| 4,194,221 A | 3/1980 | Stoffel ................ 358/283 |
| 4,668,995 A | 5/1987 | Chen et al. ............ 358/282 |
| 4,955,065 A | 9/1990 | Ulichney .............. 382/50 |
| 5,014,333 A | 5/1991 | Miller et al. ......... 382/54 |
| 5,031,050 A | 7/1991 | Chan .................. 358/298 |
| 5,045,952 A | 9/1991 | Eschbach .............. 358/447 |
| 5,053,888 A | * 10/1991 | Nomura ............. 358/3.22 |
| 5,325,211 A | 6/1994 | Eschbach .............. 358/466 |
| 6,369,912 B1 | * 4/2002 | Kumashiro ........... 358/1.9 |

OTHER PUBLICATIONS

Toshiaki Kakutani, "An Improved Error Diffusion Method Suppressing Image Distortion", *Journal of Japan Photograph Society*, vol. 60, No. 6, pp. 353–356 (1997) (with partial English translation).

* cited by examiner

Primary Examiner—Bhavesh M. Mehta
Assistant Examiner—Ali Bayat
(74) Attorney, Agent, or Firm—Burns, Doane, Swecker & Mathis, LLP

(57) ABSTRACT

An image forming apparatus capable of solving problems in error diffusion method is provided. An input pixel value is thresholded using a corrected threshold value Th (x), and a binarized pixel value is output. The corrected threshold value Th (x) is subtracted from the output value, multiplied by a feed back coefficient β, and thereafter, the result is diffused to threshold values of pixels around the pixel of interest.

35 Claims, 56 Drawing Sheets

FIG. 2

|   |   | ○ | 32 | 8 |
|---|---|---|----|---|
| 2 | 16 | 32 | 16 | 4 |
| 1 | 4 | 8 | 2 | 1 |

($\beta=0$)

($\beta=1$)

($\beta=0$)

($\beta=1$)

($\beta=0.5$)

ALGORITHM OF THRESHOLD VALUE DIFFUSION METHOD

FIG. 30 THRESHOLD VALUE th, COEFFICIENT β AND RESULTING γ CHARACTERISTIC (ABSCISSA: INPUT, ORDINATE: OUTPUT)

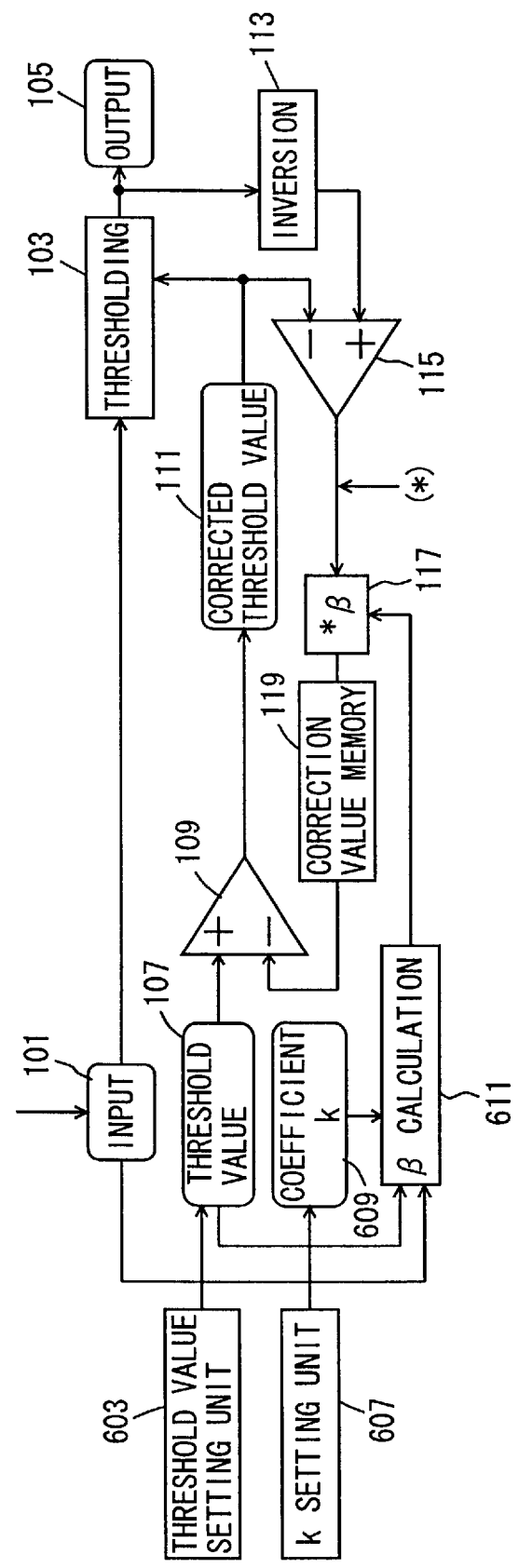
F I G. 31

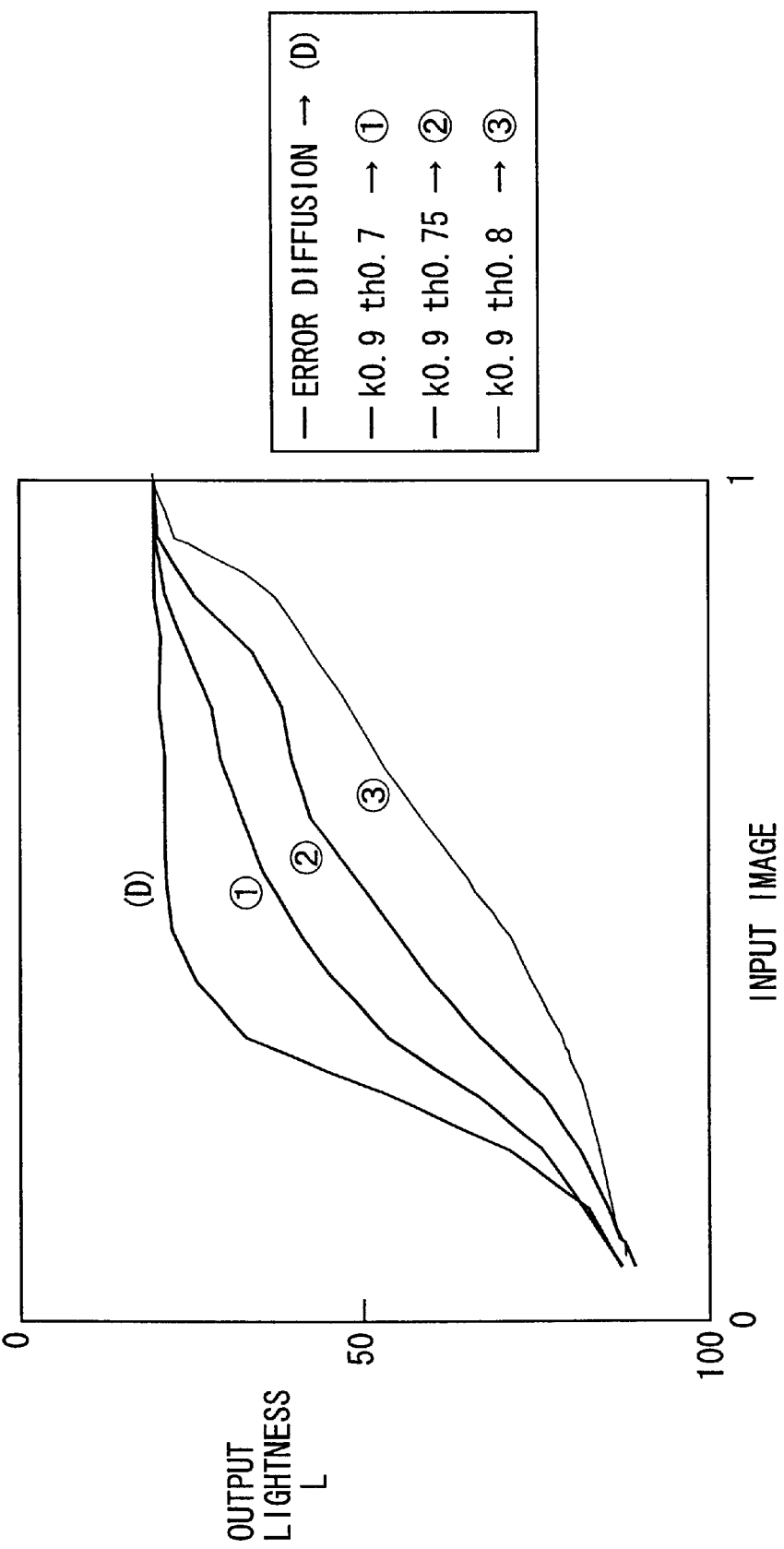
F I G. 40

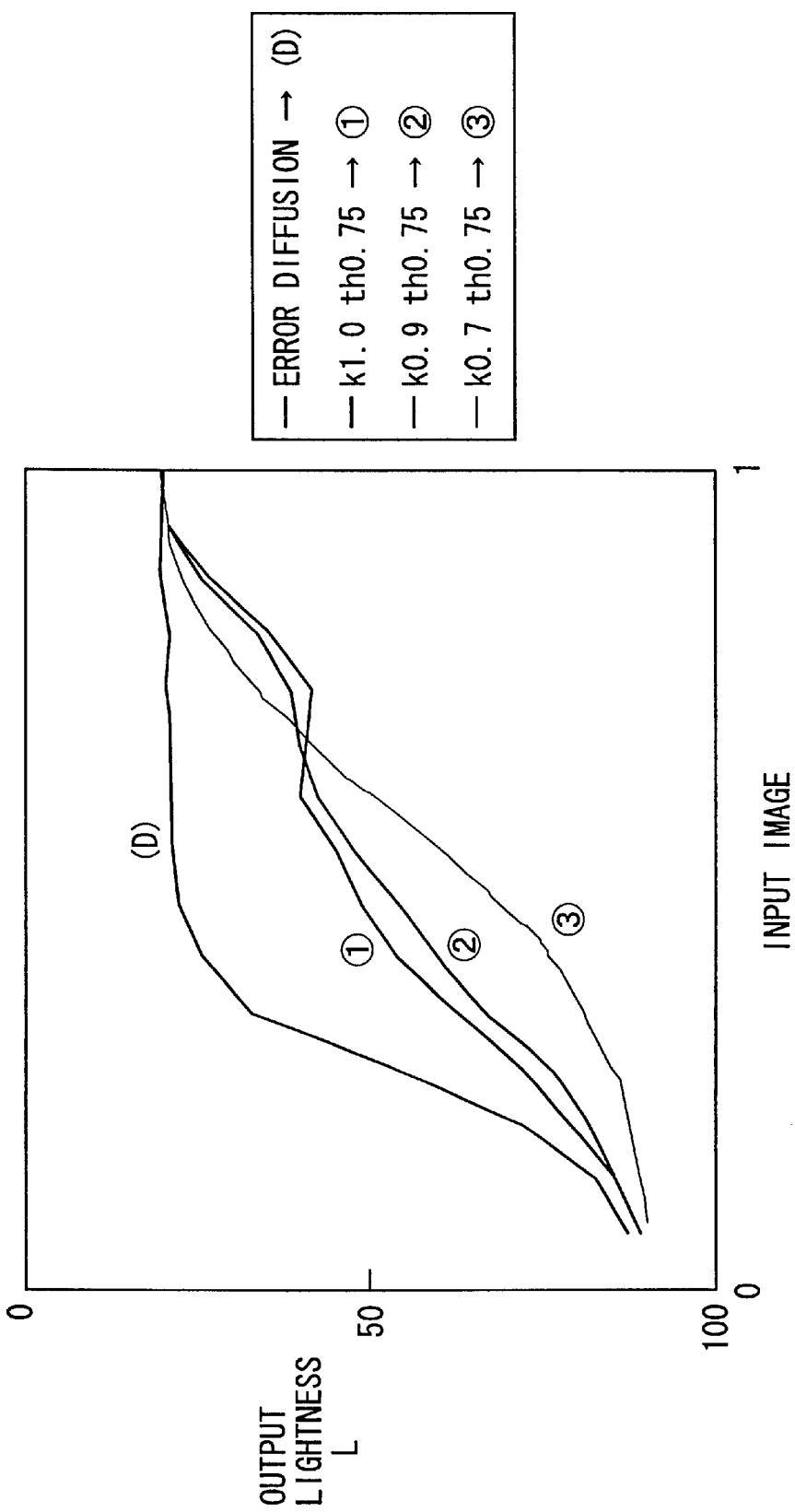
F I G. 41

0 ≦ INPUT ≦ 1
COEFFICIENT n = const
COEFFICIENT k = const
THRESHOLD VALUE th = const
OUTPUT = 0 or 1

(dith00)

(dith01)

(dith02)

(dith03)

METHOD AND APPARATUS OF IMAGE PROCESSING CAPABLE OF GRADATION REDUCING PROCESS WITH HIGH IMAGE QUALITY

This application is based on application Nos. 10-288834, 11-200249 and 11-237492 filed in Japan, the contents of which is hereby incorporated by reference.

BACKGROUND OF THE INVENTION

1. Field of the Invention

The present invention relates to method and apparatus of image processing, and, more specifically, to method and apparatus of image processing capable of performing gradation reducing process in which number of gradations of image data is reduced, by using threshold values.

2. Description of the Related Art

Handling of images in digital manner is currently dominant in the field of image processing. It is often the case that for displaying or outputting digital image, it becomes necessary to display gradations of the image in smaller number of gradation levels, because of restrictions imposed by characteristics of an output device and the like. From the early stages of development, various methods of digital half toning image processing such as binarization, in which gradations are reproduced solely by white and black dots as a pseudo halftone processing, has been studied.

Various methods including ordered dither method and error diffusion method, which are still utilized at present, as well as descendents of these methods have been developed and improved from 1960's. Further, as the hardware of computation has been developed recently, a method of directly performing optimal search for pixel arrangement, such as the method of cost minimization, has been developed.

These methods of half toning have respective advantages and disadvantages in accordance with the objects of use, and therefore various problems and solutions for respective methods have been studied. For example, the ordered dither method is simple and easy to use, while reproduced image quality is not very good. Though load of computation is heavier in the error diffusion method than the dither method, image quality is better.

In the method of directly performing optimal search such as the method of cost minimization, various optimization methods such as neural network, genetic algorithm and simulated annealing are utilized. Adoption of such a method facilitates incorporation of a visual model or an output device model into the process, enlarging degree of freedom in the processing. On the other hand, as the optimal state is searched through repetitive operations, load becomes formidable.

The problems change along with the development of technology. The problem of formidable load experienced when the method of directly performing optimal search is used may be solved by the development of hardware defining the speed of calculation. From the viewpoint of promoting wide spread use of simple and high quality output devices, however, simpler calculation process is desired.

Further, there are the problem of trade off between resolution and gradation common to all the methods. This problem may possibly be solved by increased output gradation levels or improved resolution characteristic of the output device itself. It is expected, however, that there will be increased occasions where characters are processed as images, and such processing should desirably be done in the simplest manner possible.

Conventionally, methods of improving image processing have been studied, including a method in which an image region of which gradation is of importance and an image region of which resolution is of importance are determined and the method of processing is changed in accordance with the result of determination for respective regions, and a method in which a plurality of processing methods are combined. These methods are hardly said to be simple methods, as a new process of region determination, for example, must be developed and added to execute such methods. Considering balance with the hardware (output device), it is desirable that satisfactory resolution and gradation are both attained through such a method that is comparable to the error diffusion method.

FIG. 66 is a block diagram showing a configuration of a conventional image processing apparatus executing the error diffusion method.

Referring to the figure, the image processing apparatus includes: an input unit 501 receiving as an input a pixel value of one pixel of a multi-value image; a subtractor 503 subtracting diffused error from the input pixel value; an output unit 505 outputting, as a corrected pixel value, an output from subtractor 503; thresholding unit 507 performing thresholding on the output of output unit 505 to provide binary data; an output unit 509 outputting, as pixel data, the output of thresholding unit 507; a subtractor 511 subtracting the output of output unit 505 from the output of thresholding unit 507; and an error memory 513 for diffusing the output result from subtractor 511 to pixels around a pixel which is the object of processing (pixel of interest).

The image formed through error diffusion method has a particular texture. The texture is not very noticeable visually, as it has blue noise characteristic. A method of setting dither pattern to attain the blue noise characteristic in a simple manner has been studied for the dither method as well. In the error diffusion method, however, dot patterns are adaptively generated with respect to the input image, and therefore characteristic of the input image is better reflected than the dither method.

In this point, the error diffusion method is superior in image quality to dither method. The error diffusion method, however, has its particular noise. Namely, there occurs a phenomenon in which variation in texture at a region where gradation changes moderately results in an apparent border line where there is no border (texture shift), or a phenomenon in which white or black dots are tend to appear in a line at a region where degradation is close to black or white.

Various methods for improving have been developed to prevent these phenomena, including modulation of weight coefficient and threshold value for error diffusion. As to resolution, though inherent edge enhancement characteristic has been pointed out, it is not sufficient.

Further, from the nature of its algorithm, the error diffusion method functions to reproduce pixel values of the input image in averaging manner. More specifically, the method functions to reproduce local 0th order component of the image. Accordingly, the error diffusion method has been improved to enhance components of 1st and higher order.

SUMMARY OF THE INVENTION

An object of the present invention is to solve the problems of the above described methods of image processing, and to provide apparatus and method of image processing capable of improving image quality.

The above described objects can be attained by an image processing apparatus in accordance with an aspect of the present invention, converting a first image signal representing density level of each pixel in a prescribed number of gradations to a second image signal having a smaller number of gradations than the prescribed number, including a converter successively receiving as inputs first image signals of pixels, comparing density levels of respective pixels with a prescribed threshold and converting to the second image signals, and a feed back circuit based on the signal levels of the second image signals output from the converter and correcting the prescribed threshold value used in subsequent conversion of pixels.

Preferably, the feed back circuit includes control means for controlling a feed back value in the feed back circuit.

Preferably, the control means includes a feed back coefficient setter for setting a feed back coefficient.

Preferably, the feed back coefficient setter is capable of changing feed back coefficient.

Preferably, the feed back coefficient setter sets the feed back coefficient which changes in accordance with density level of each pixel converted by the converter.

Preferably, the feed back coefficient setter includes a calculating unit calculating the feed back coefficient based on a prescribed relation between the feed back coefficient and each density level of each pixel converted by the converter, and means for changing the prescribed relation used in the calculating unit.

Preferably, the first image signal has a plurality of color components, and the feed back coefficient setter sets the feedback coefficient which changes in accordance with the color component of the image signal converted by the converter.

Preferably, the feed back circuit includes a correction value memory dispersing the feed back value provided by the feed back circuit to a plurality of peripheral pixels to be converted subsequently, in accordance with weight set for each of the peripheral pixels.

Preferably, the weight of the correction value memory is variable.

Preferably, the image processing apparatus further includes a threshold value generating unit generating, as the prescribed threshold value, a value which varies for conversion of each pixel.

Preferably, the threshold value generating unit changes the prescribed threshold value in accordance with the position of the pixel to be converted.

Preferably, the threshold value generating unit changes the prescribed threshold value in accordance with density level of the pixel to be converted.

Preferably, the first image signal has a plurality of color components, and the threshold value generating unit changes said prescribed threshold value in accordance with the color component of the pixel to be converted.

Preferably, the image processing apparatus further includes a multiplier provided preceding the converter, multiplying the density level of each pixel to be converted by the converter by a prescribed coefficient.

Preferably, the prescribed coefficient is variable.

Preferably, the image processing apparatus adjusts gradation characteristic representing relation between level of the first pixel signal and level of the second image signal after conversion by varying at least one of the prescribed threshold value and the feed back coefficient.

Preferably, the image processing apparatus fixes gradation characteristics for the maximum and minimum levels of the first image signal, and adjusts gradation characteristic of an intermediate level between the maximum and minimum levels by changing at least one of the prescribed threshold value and the feed back coefficient.

Preferably, the image processing apparatus superposes a signal component not related to the first image signal to be converted, on any signal in the image processing apparatus.

Preferably, the signal component to be superposed represents a periodic pattern.

Preferably, the periodic pattern is any of a dispersed dither pattern, a concentrated dither pattern and a line pattern.

Preferably, the signal component to be superposed is random noise.

Preferably, the random noise is any of white noise, blue noise and pink noise.

Preferably, the feed back circuit feeds back difference between an inverted value of the signal level of the second image signal output from the converter and the threshold value.

The method of image processing in accordance with another aspect of the present invention for converting a first image signal representing density level of each pixel by a prescribed number of gradations to a second image signal having a smaller number of gradations than the prescribed number includes a conversion step in which the first image signals of pixels are successively input, density levels of respective pixels are compared with a prescribed threshold value and converted to the second image signals, and a feed back step in which based on the signal level of the second image signals output as a result of the conversion step and the threshold value, correcting the prescribed threshold value to be used for subsequent conversion of pixels.

Preferably, the feed back step includes a control step of controlling a feed back value in the feed back step.

Preferably, the method of image processing further includes the step of generating threshold value, generating, as the prescribed threshold value, a value which varies for conversion of each pixel.

Preferably, in the method of image processing, gradation characteristic representing relation between the level of the first image signal and the level of the second image signal after conversion is adjusted by changing at least one of the prescribed threshold value and a feed back coefficient.

Preferably, in the method of image processing, gradation characteristic for the maximum and minimum levels of the first image signal is fixed, and gradation characteristic of an intermediate level between the maximum and minimum levels is adjusted by changing at least one of the prescribed threshold value and feed back coefficient.

According to a still further aspect of the present invention, the image processing apparatus converting a first pixel signal representing density level of each pixel in a prescribed number of gradations to a second image signal of a smaller number of gradations than the prescribed number includes an assignment circuit successively receiving as inputs the first image signals of pixels and assigning to sections corresponding to the number of gradations of the second image signal; a normalizing circuit normalizing the input first image signals in the sections assigned by the assignment circuit; a comparator successively receiving as inputs the first image signals normalized by the normalizing circuit, and comparing signal levels of respective pixels with a prescribed threshold value; a feed back circuit correcting the prescribed threshold value to be used for subsequent conversion of pixels, based on the result of comparison output from the comparator and the prescribed threshold value; and an allocating circuit for allocating gradation levels of the second image signal to each pixel, in accordance with the sections assigned by the assignment circuit and the result of comparison output from the comparator.

Preferably, the feed back circuit includes control means for controlling the feed back value in the feed back circuit.

Preferably, the feed back circuit includes a correction value memory dispersing the feed back value of the feed back circuit to a plurality of peripheral pixels to be converted subsequently, in accordance with weight set for each of the peripheral pixels.

Preferably, the image processing apparatus further includes a threshold value generating unit generating, as a prescribed threshold value, a value which changes for conversion of each pixel.

In accordance with a still further aspect of the present invention, the image processing apparatus converting a first image signal representing density level of each pixel in a prescribed number of gradations for each of a plurality of color components to a second image signal of smaller number of gradations than the prescribed number has a plurality of image processing units provided for respective color components, and each image processing unit includes a converter successively receiving as inputs the first image signals of pixels, comparing density level of each pixel with a prescribed threshold value and converting to the second image signals, and a feed back circuit correcting the prescribed threshold value to be used for subsequent conversion of pixels, based on the signal levels of the second image signals output from the converter and the threshold value.

Preferably, the feedback circuit includes control means for controlling a feed back value in a feed back circuit, and the feed back value differs in each color component.

Preferably, the image processing unit uses the prescribed threshold value different from color component to color component.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustration representing function of correction value memory 119.

FIG. 31 is a block diagram representing a configuration of an image forming apparatus in accordance with a fourth embodiment of the present invention.

FIG. 40 is a graph representing change in γ characteristic in accordance with the threshold diffusion method.

FIG. 41 is a graph representing change in γ characteristic in accordance with the threshold diffusion method.

DESCRIPTION OF THE PREFERRED EMBODIMENTS

First Embodiment

Figure 1:
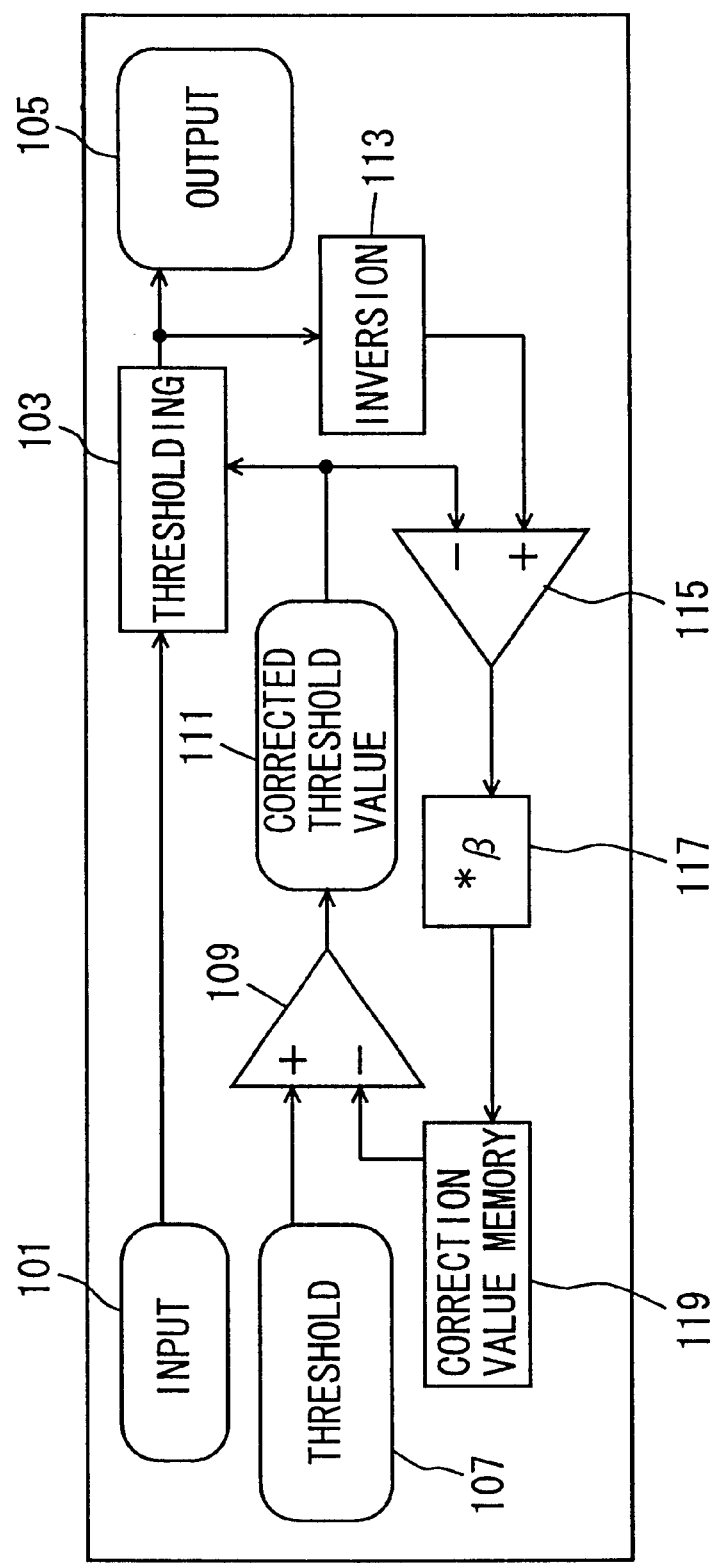
FIG. 1 is a block diagram showing configuration of the image forming apparatus in accordance with one embodiment of the present invention.

Image binarizing process performed by the apparatus of FIG. 1 will be referred to as "threshold value diffusion method." In the figures of the present application, portions surrounded by the normal rectangles represent portions performing some operations, while portions surrounded by rounded rectangles represent portions which do not perform any operation but simply provides values.

Referring to FIG. 1, the image forming apparatus includes an image (pixel value) input unit 101, a thresholding unit 103, a binary image output unit 105, an inverting unit 113, initial threshold value generating unit 107, a subtracting unit 109, a corrected threshold value output unit 111, a subtracting unit 115, a coefficient multiplying unit 117 and a correction value memory 119.

One pixel value (0~1) of a multi-value image is input to image input unit 101. When a multi-value image n of 256 gradations (0~255) is to be handled, for example, a normalized value normalized to 0~1 (n/255) is input to image input unit 101. Thresholding unit 103 compares a corrected threshold value Th (x) output from corrected threshold value output unit 111 with the pixel value input to image input unit 101. When pixel value≧corrected threshold value Th (x), thresholding unit 103 outputs "1" and, when pixel value<corrected threshold value Th (x), thresholding unit 103 outputs "0". Consequently, binary image output unit 105 outputs an image having binary value of "0" or "1".

Initial threshold value generating unit 107 outputs an initial threshold value Th (x) before correction. The initial threshold value Th (x) before correction may be a constant value, or it may be varied in accordance with the position of the pixel so as to provide a dither pattern.

Subtractor 109 reads a correction value stored in correction value memory 119 which corresponds to the pixel of the object of processing (pixel of interest), and subtracts the correction value from the initial threshold value Th (x). The result is the corrected threshold value Th (x).

Inverting unit 113 inverts an output from thresholding unit 103. More specifically, when the output from thresholding unit 103 is "0", inverting unit 113 outputs "1", and when the output is "1", provides "0".

Subtracting unit 115 subtracts corrected threshold value Th (x) from the output of inverting unit 113, and outputs the result. Coefficient multiplying unit 117 multiplies the output of subtracting unit 115 by a feed back coefficient β which is set between 0 to 1, and outputs the result. When β=0, it means that the threshold value diffusion is not performed.

Figure 2:
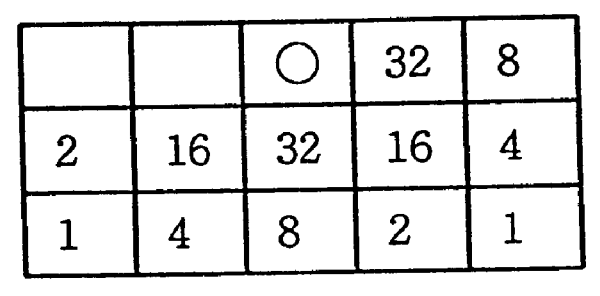

Correction value memory 119 is a memory for dispersing the output result of coefficient multiplying unit 117 to the correction value of the threshold for pixels around that pixel which is the object of processing. Referring to FIG. 2, a pixel which is the object of processing is represented by a white circle and output result from coefficient multiplying unit 117 is allocated and stored with the ratio (weight coefficient) of 1 to 32 to the correction values of threshold values of the pixels therearound.

As can be seen from FIG. 2, the number of pixels to which the output result of coefficient multiplying unit 117 is distributed is made larger as compared with the common error diffusion method, in order to prevent uniformity of values to be distributed, by increasing the types of weight coefficients for distribution. More specifically, in the error diffusion method, diffusion process is performed on widely varying input values (pixel value), while in the threshold value diffusion method, it is often the case that the diffusion process is performed on a constant or almost constant threshold value. When the initial threshold value before correction is not a constant value but widely varying, the number of pixels to which outputs are distributed may be reduced.

Figure 66:
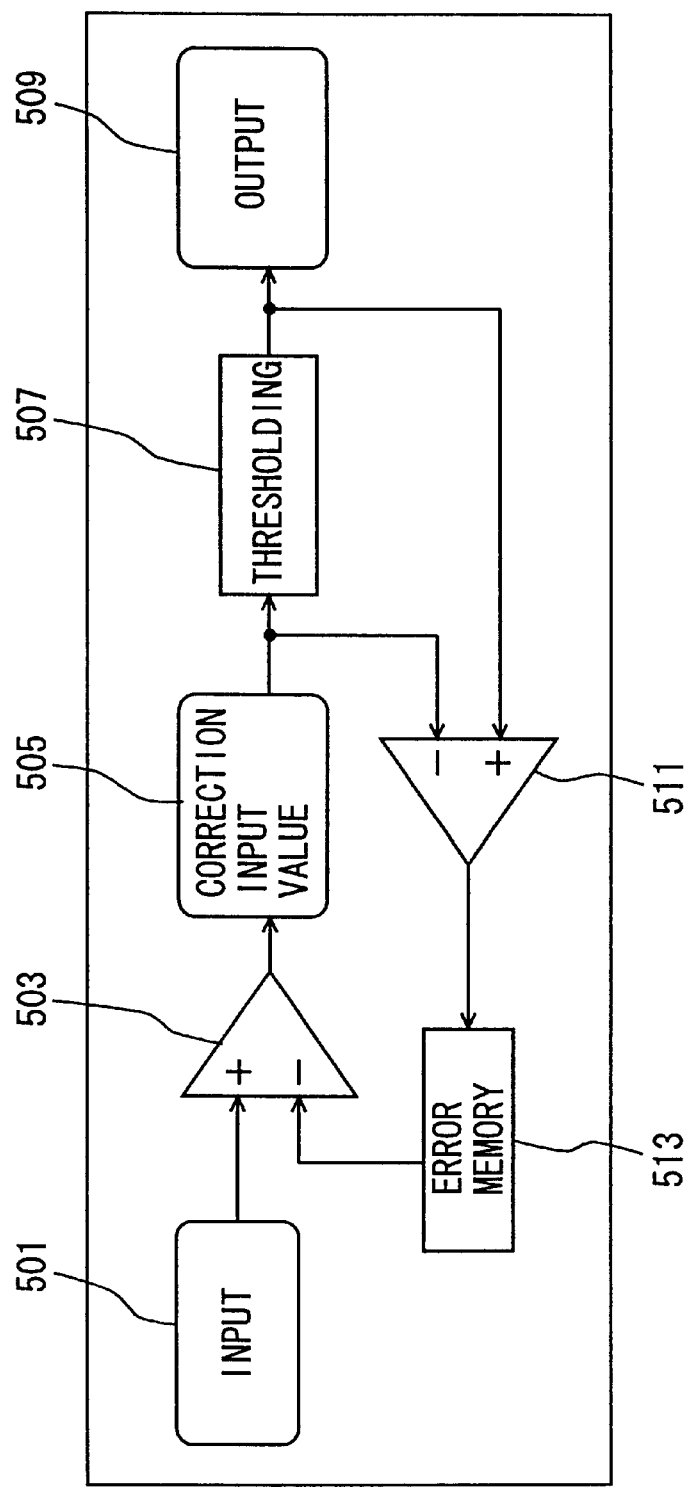
FIG. 66 represents configuration of an image processing apparatus utilizing the error detection diffusion method.

As compared with the block diagram (FIG. 66) of the image processing apparatus utilizing the error diffusion method, in the apparatus utilizing the threshold value diffusion method, inversion is performed by the inverting unit 113 when feeding back the output. This is performed as the output result is an output viewed from the input side, and hence it is necessary to change the output to one viewed from the threshold value.

Further, feed back coefficient β is multiplied in the coefficient multiplying unit 117 in feeding back the threshold value. As will be described later, this process is to effect reproduction of the input value uniformly, in the threshold value diffusion method which functions, if the feedback coefficient β is not multiplied, simply to reproduce the threshold value uniformly.

The output image when feed back coefficient β is changed will be described in the following.

Figure 9:
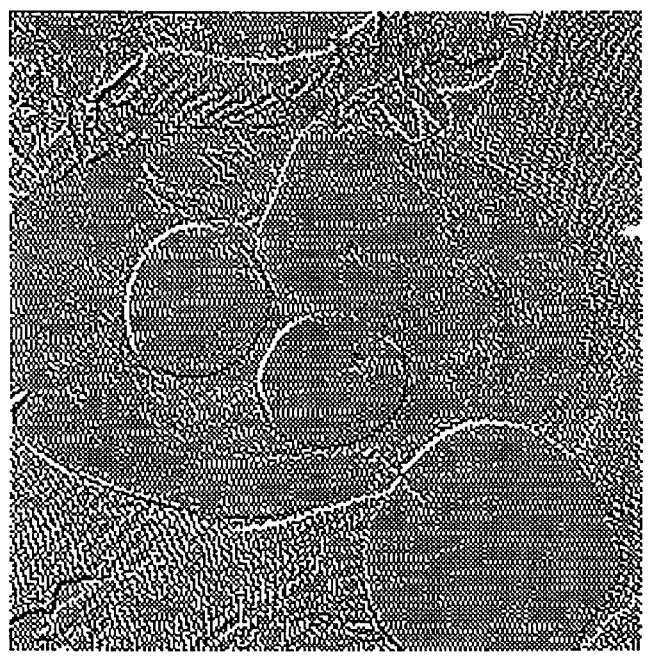
FIG. 9 represents result of threshold value diffusion process when feed back coefficient is set to $\beta=1$.
Figure 10:
FIG. 10 represents result of threshold value diffusion process when feed back coefficient is set to $\beta=0$.
Figure 11:
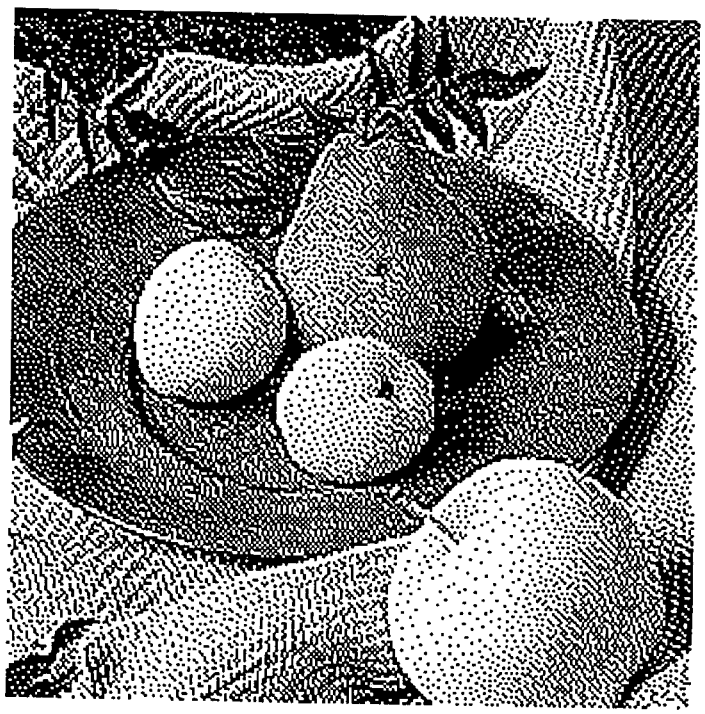
FIG. 11 represents result of threshold value diffusion process when feed back coefficient is set to $\beta=0.5$.

FIGS. 9 to 11 represent image samples binarized in accordance with the threshold value diffusion method with the feed back coefficient β changed to 1, 0 and 0.5, respectively. The initial threshold value was made constant at the central value of 0.5. In the example shown in FIG. 9 where feed back coefficient β=1, white and black dots are distributed approximately uniformly with the density of half and half on the entire image plane, and density value of the threshold value, that is, 50% is reproduced. Only the edge portion of the input image is enhanced, the image as a whole is flat and contours only are reproduced. More specifically, though local 1st order component of the input image is reproduced in the output image, local 0th order component of the input image is not reproduced, and instead, the threshold value is reproduced. Here, the image is formed of local 0th order component flow frequency component) and local 1st and higher order components (high frequency component).

When feed back coefficient is set to β=0 as shown in FIG. 10, it means that threshold value diffusion is not performed, and therefore the magnitude of input value is determined simply based on the threshold value (0.5), and binarized to provide such an image.

When the feed back coefficient is set to the intermediate value of 0.5 between 1 and 0 as shown in FIG. 11, the image is intermediate between the images of FIGS. 9 and 10. As can be seen from the sample image, when the feed back coefficient β is set to 0.5, local 0th order component of the input image can be reproduced, not the threshold value. Of course, the local 1st or higher order components of the input image are also reproduced.

Figure 12:
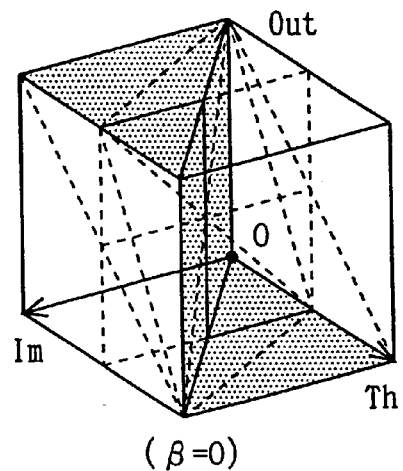
FIG. 12 is an illustration representing a relation between each of input value Im, threshold value Th and output value Out when $\beta=0$, in the error diffusion method.
Figure 13:
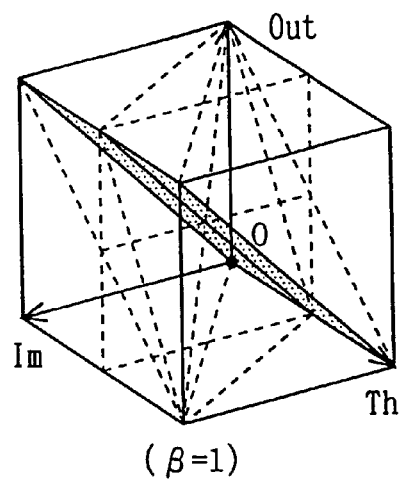
FIG. 13 is an illustration representing a relation between each of input value Im, threshold value Th and output value Out when $\beta=1$, in the error diffusion method.
Figure 14:
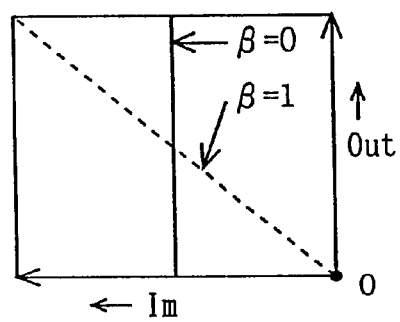
FIG. 14 is an illustration representing a relation between an input value and an output value when the threshold value is the central value.

The scheme how the input value is reflected as the local 0th order component in the threshold value diffusion method will be described with reference to FIGS. 15 to 18, which represent relations among input value, initial threshold value and output value. For reference, FIGS. 12 to 14 represent relations among input value, threshold value and the output value when the error diffusion method is used.

In these figures, the output value Out for the input value Im and the initial threshold value Th is represented by a hatched plane in a three-dimensional space, with the origin O. Essentially, the output value can take only two values, that is, max ("1") and min ("0"), and therefore, the output value Out represents average reproduction value, that is, local dot density.

Figure 18:
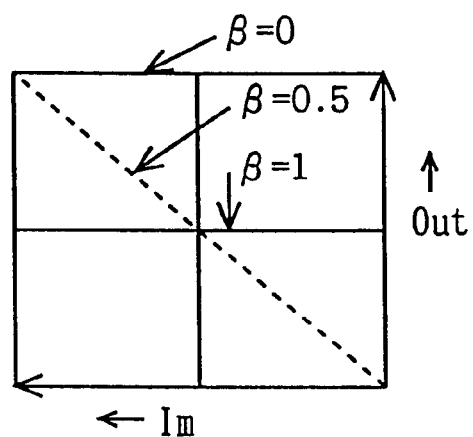
FIG. 18 is an illustration showing a relation between an input value and an output value when the threshold value is the central value.

Further, the output value Out for the input value Im with initial threshold value Th kept constant at the central value is also shown as a line, in each three-dimensional space. FIG. 18 is a two-dimensional graph representing a relation between input value Im and output value Out when the initial threshold value Th is kept constant at the central value.

Figure 15:
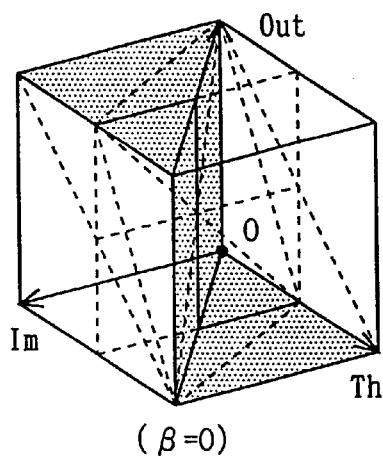
FIG. 15 is an illustration representing a relation between each of input value Im, threshold value Th and output value Out when $\beta=0$, in the threshold value diffusion method.
Figure 16:
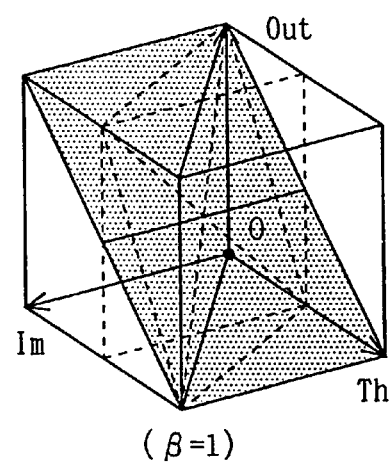
FIG. 16 is an illustration representing a relation between each of input value Im, threshold value Th and output Out when $\beta=1$, in the threshold value diffusion method.

When the feed back coefficient is β=0 as shown in FIG. 15, the threshold value diffusion is not performed. When the feed back coefficient is β=1 as shown in FIG. 16, the output value Out depends only on the initial threshold value Th. Namely, when the initial threshold value Th is constant, the output value Out is also constant. Therefore, in the threshold value diffusion method, it is important to set the feed back coefficient β between 0 and 1.

Figure 17:
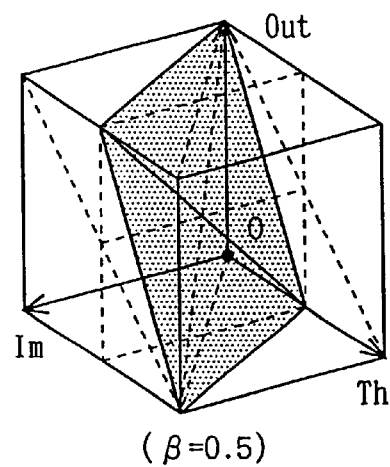
FIG. 17 is an illustration representing a relation between each of input value Im, threshold value Th and output Out when $\beta=0.5$, in the threshold value diffusion method.

As the feed back coefficient β changes from 0 to 1, functional surface of output value Out is gradually inclined, and when feed back coefficient β=0.5, it comes to be inclined with respect to axial directions of both input value Im and initial threshold value Th, as shown in FIG. 17. Namely, in this case, output value Out depends both on the input value Im and the initial threshold value Th. Therefore, by setting the value β to 0.5, it becomes possible to reflect local 1st and higher order components of the input image and to reproduce local 0th order component of the input image, by the algorithm of the threshold value diffusion method.

As described above, it is important to set the feed back coefficient β so as to enable reproduction of input value Im in averaging manner. As can be seen from the figures, generally, the feed back coefficient of around β=0.5 is appropriate. It depends, however, on conditions. More specifically, the feed back coefficient of β=0.5 is preferable only when the initial threshold value is constant or almost constant at the central value as shown in the example, and when the initial threshold value differs, the optimal value of feed back coefficient β changes.

Figure 19:
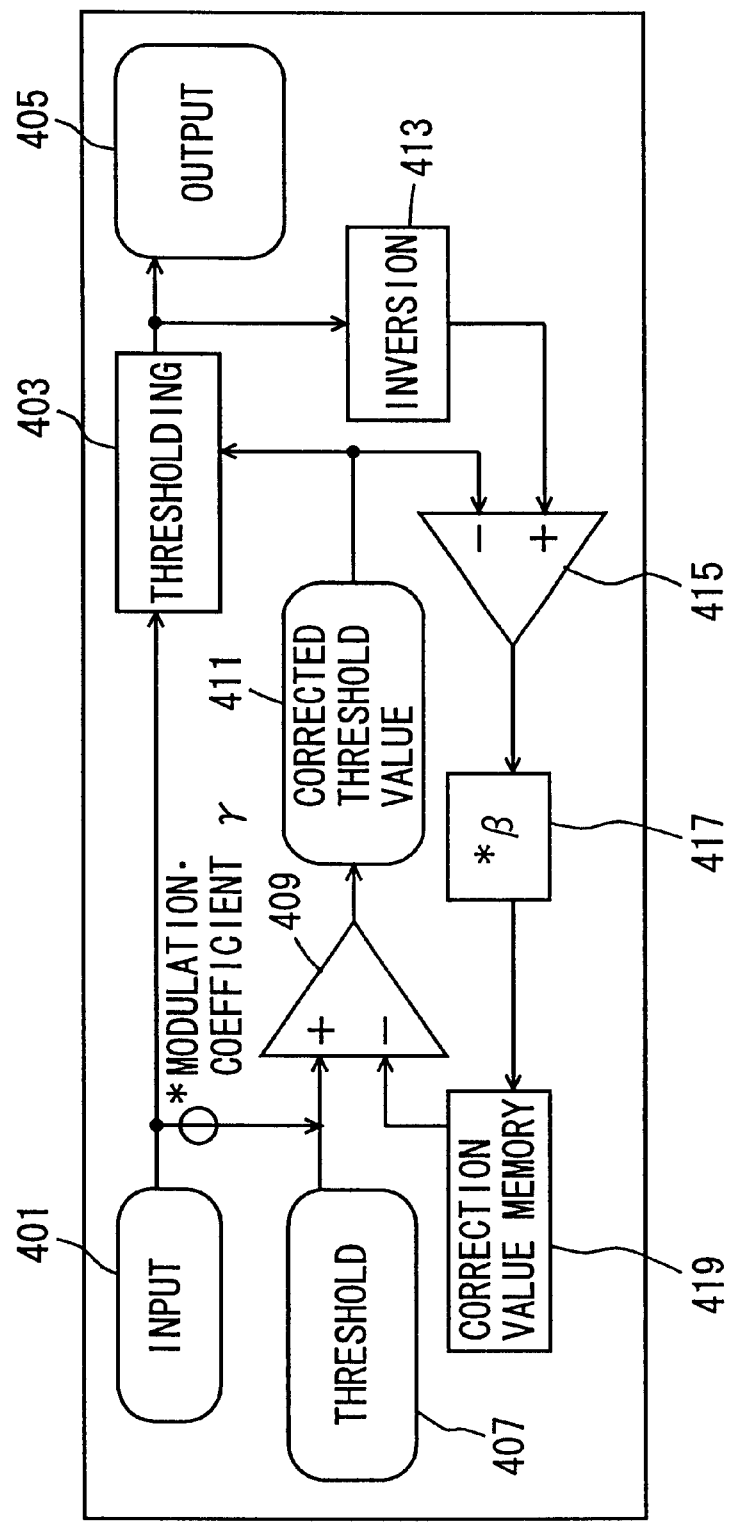
FIG. 19 is a block diagram of the image forming apparatus employing threshold value diffusing method in which initial threshold value Th (x) is modulated by an input value.

For example, as shown in FIG. 19, the initial threshold value Th (x) may be modulated by other elements such as an input value. In that case, the feed back coefficient β varies in accordance with how much the output depends on the input value. It is assumed from FIGS. 15 to 17 that as the degree of negative dependence on input value Im increases, the output functional surface rises and the optimal feed back coefficient β becomes closer to 0. As the degree of positive dependence on the input value increases, the output functional surface becomes flat, and the optimal feed back coefficient β becomes closer to 1. Therefore, it can be understood that though any initial threshold value may be used, it is necessary to change setting of the feed back coefficient β accordingly.

By setting the feed back coefficient β to fully exhibit the characteristic of the output functional surface, it becomes possible by the threshold value diffusion method to reproduce the local 1st and higher order components of the input value, that is, high frequency components with priority, and at the same time to reproduce local 0th order component, that is, the low frequency component.

FIGS. 12 to 14 represent relations among the three factors in the error diffusion method, in which β=0 in FIG. 12 represents an example in which the error diffusion is not performed. More specifically, in FIG. 12, simple binarization using a threshold value is performed. In FIG. 13, where β=1, normal error diffusion method is performed. The output value Out reflects the input value Im. In the error diffusion method, even when β is set intermediate between 0 and 1, the output function reflects the input value where the input value is close to the threshold value, and where the input value is close to max or min, only a simple binarization is performed, and therefore there is not a significant meaning of such setting. More specifically, in the error diffusion method, setting of β between 0 and 1 merely results in insufficient error diffusion.

The function and effects of the threshold value diffusion method as compared with the error diffusion method will be described in the following. As can be seen from the comparison between the image processing apparatus utilizing the error diffusion method shown in FIG. 64 and the apparatus utilizing the threshold value diffusion method shown in FIG. 1, these two methods differ very much in that in the error diffusion method, difference between an input pixel value and an output is fed back to the input, whereas in the threshold value diffusion method, difference between the threshold value and the output is fed back to the threshold value. More specifically, the object of which difference from the output is calculated, and the object to which the difference is fed back, are the input value (input pixel value) in the error diffusion method, whereas in the threshold value diffusion method, it is the threshold value. It is noted that even in the threshold value diffusion method, similar texture (blue noise characteristic) to the error diffusion method can be obtained by the feed back algorithm.

Figure 3:
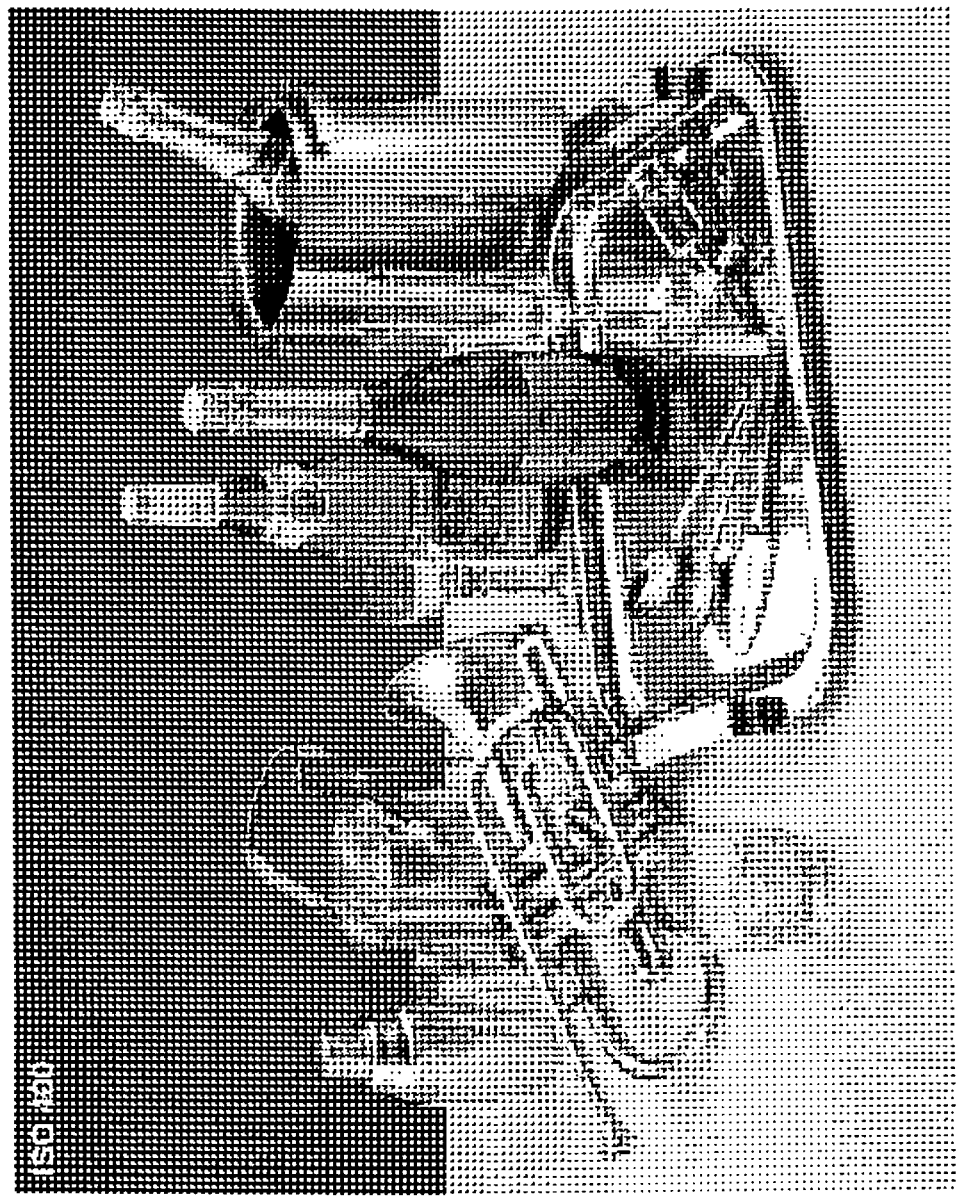
FIG. 3 shows result of halftone processing in accordance with ordered dither method.
Figure 4:
FIG. 4 shows result of halftone processing using error diffusion method.
Figure 5:
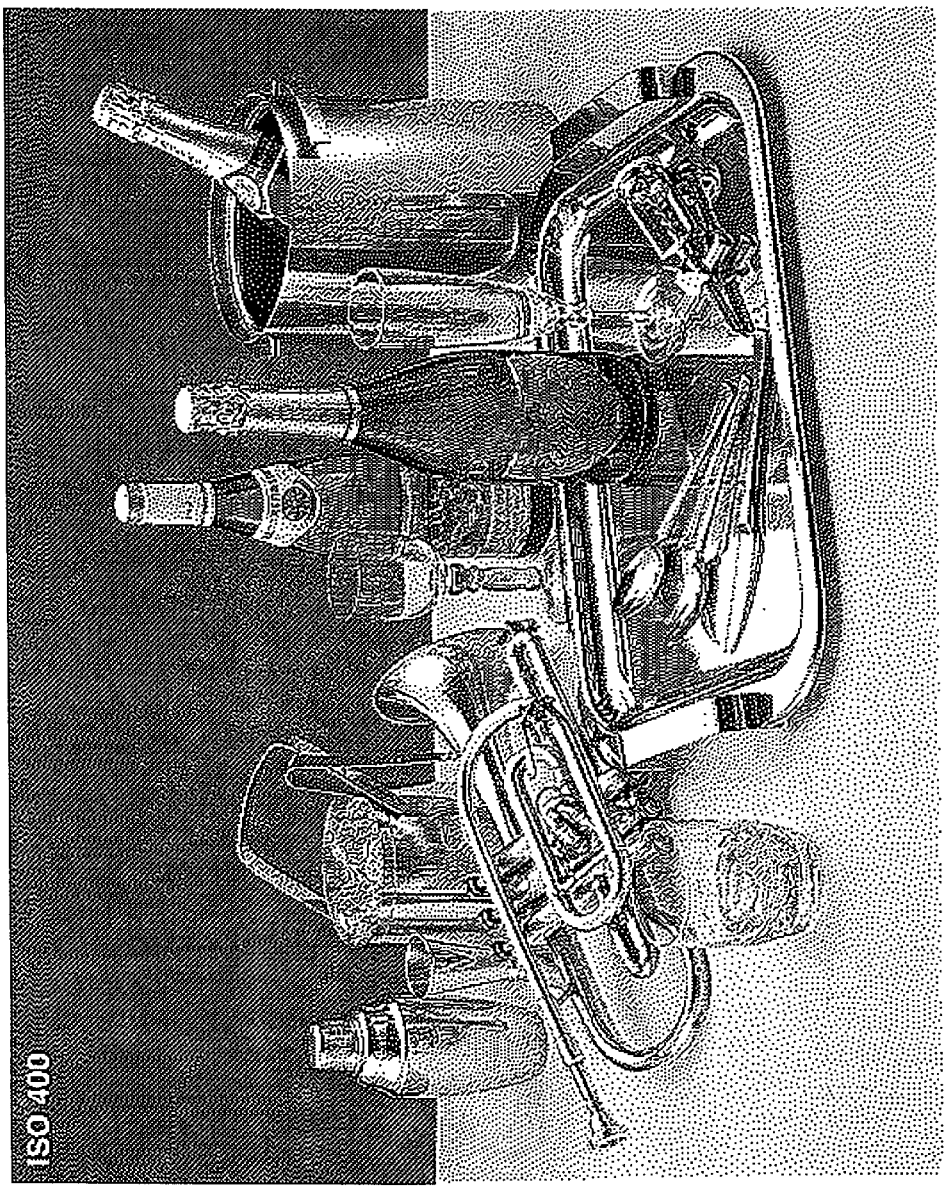
FIGS. 5 and 6 show results of halftone processing in accordance with threshold value diffusion method.

FIG. 3 represents the result of halftone processing in accordance with ordered dither method of a fat-type pattern of 4×4 pixels, FIG. 4 shows the result of halftone processing in accordance with the error diffusion method, and FIG. 5 represents the result of halftone processing in accordance with the threshold value diffusion method (feed back coefficient $\beta=0.5$), using initial threshold value Th (x) of a constant value.

Both gradation and resolution are the worst in the ordered dither method. In the error diffusion method, gradation and resolution are both better than the dither method. In the threshold value diffusion method, particularly the resolution is better than in the error diffusion method. As to gradation and texture, the results of the threshold value diffusion method are comparable to those of the error diffusion method. It is noted that in the threshold value diffusion method, texture shift as in the error diffusion method, is observed. The defect of dots aligned in a line in a region close to black or white, experienced in the error diffusion method, is not observed in the threshold value diffusion method.

Figure 6:
Figure 7:
FIG. 7 shows result of halftone processing in accordance with error diffusion method.
Figure 8:
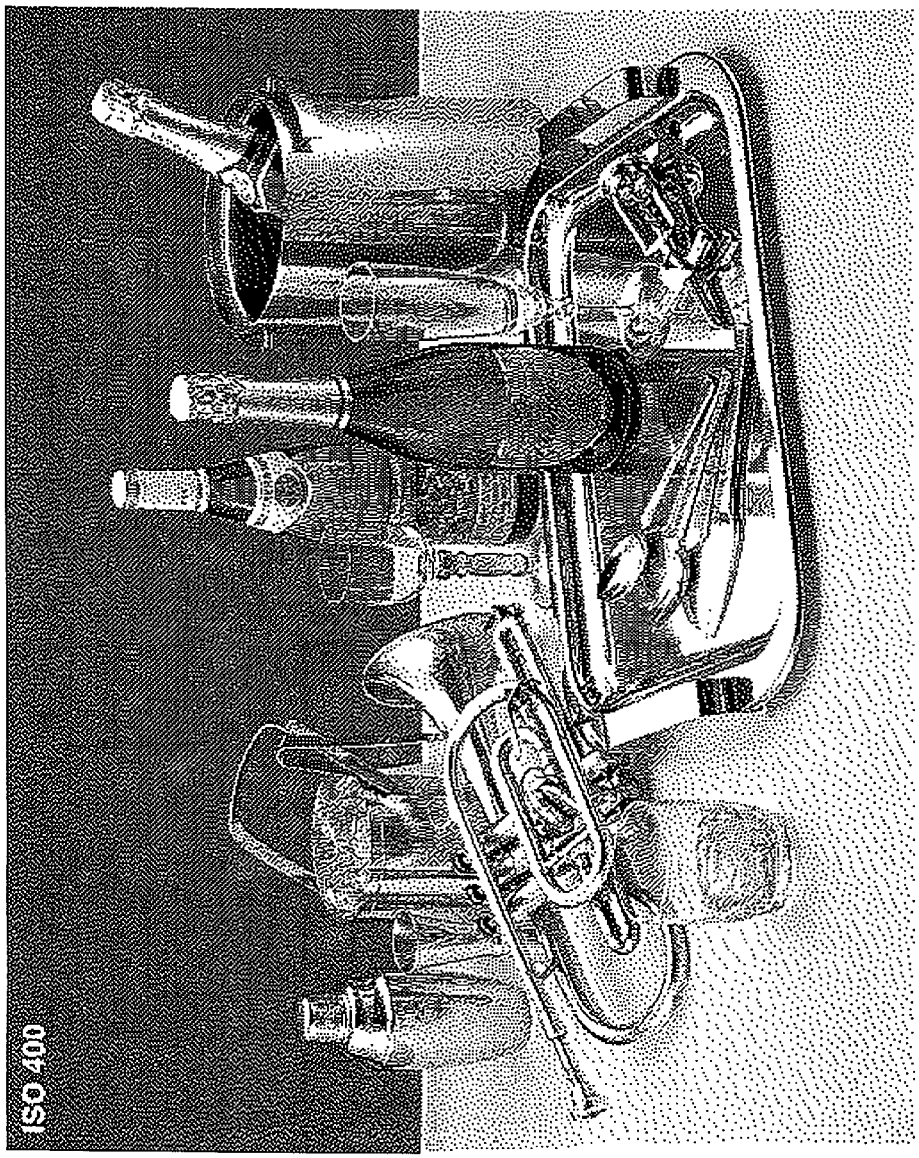
FIG. 8 shows a result of halftone processing in accordance with error diffusion method with edge enhancement.

FIG. 6 represents the result of halftone processing by the threshold value diffusion method (feed back coefficient $\beta=05$) using fat-type dither pattern of 4×4 pixels as the initial threshold value Th (x), FIG. 7 represents the result of halftone processing in accordance with the error diffusion method modifying the fat-type pattern of 4×4 pixels as the threshold value, and FIG. 8 represents the result of halftone processing in accordance with the error diffusion method with edge enhancement.

As the dither pattern is used as the initial threshold value Th (x) in the threshold value diffusion method, the texture shift is improved. Similar improvement is observed in the error diffusion method. In the threshold value diffusion method, however, this improvement does not affect other characteristic such as the resolution, and hence the threshold value diffusion method is still superior to the error diffusion method. By the error diffusion method with edge enhancement, resolution is improved. In this example, however, the effect is restricted by the essential function of error diffusion method, that is, average reproduction of input value, and therefore reproductivity of a thin line with low contrast, for example, is not sufficient.

The characteristics of the output image quality provided by the binarization in accordance with the threshold value diffusion method are as described above. The process producing the image quality will be discussed, based on the comparison with the error diffusion method.

In the error diffusion method, the input value is made full use of. Namely, dot arrangement is adaptively determined by using a process of feeding back an error between the output and input, to produce an image reflecting the input value. In the threshold value diffusion method, the input value is not directly related to the feed back. In the threshold value diffusion method, the input value is used simply for comparison, to determine the output value. More specifically, on ("1") or off ("0") of the output is fed back, while the input value itself is not involved in the process of feed back.

In the threshold value diffusion method, however, it is possible to reflect the input value on the output result, that is, to reproduce gradation of the input image, by setting feed back coefficient $\beta$ to an appropriate value, as described above.

Further, essentially, the error diffusion method functions to reproduce, when viewed locally, the input value in average. The threshold value diffusion method is different. Though it seems disadvantageous in reproducing the input image, on the other hand, it means that the process does not tend to be restricted by the input value.

An example in which the function of the error diffusion method, that is, average reproduction of the input value has restricting influence, will be described. Assume that a gray thin line, that is, a thin line of low contrast, is on a white background. The line being gray means that the dot density is determined in accordance with the degree of the grayness. Assuming that it is 50% gray, there should be white and black dots half and half in average. As it is a thin line, if half of the dots constituting the line are made white, in an extreme case, the solid line may possibly appear as a dotted line. Namely, it is desirable in this case that the number of black dots are increased and the white dots are allocated to the periphery. The periphery, however, is originally white, and therefore no further white dots can be distributed to the periphery. More specifically, as the density of a gray thin line is reproduced in average, the characteristic of the line may be lost.

In such a case, the characteristic of the line, that is, edge characteristic of low contrast should preferably be reproduced, even if it means neglect of the gray level of the line to some extent. In the function of the error diffusion method, reproduction of local 0th order component (low frequency component) is of higher priority. Dependent on the nature of the image, however, it may be sometimes desirable to give priority to local 1st and higher order components (high frequency components). For example, where there are relatively minor unevenness existing locally, reproduction of the unevenness, that is, 1st and higher order components should be of higher priority than reproduction of the average level, that is, 0th order component. It goes without saying that at a portion of a moderate gradation, 0th order component may be reproduced.

By contrast, in the threshold diffusion method, reproduction of the local 1st and higher order components are of greater importance. Therefore, for the example of the gray thin line on a white background described above in which the function of the error diffusion method is restricting, satisfactory result can be obtained as the line edge characteristic is reproduced, by the threshold value diffusion method in which reproduction of the local 1st and higher order components is given priority.

Figure 23:
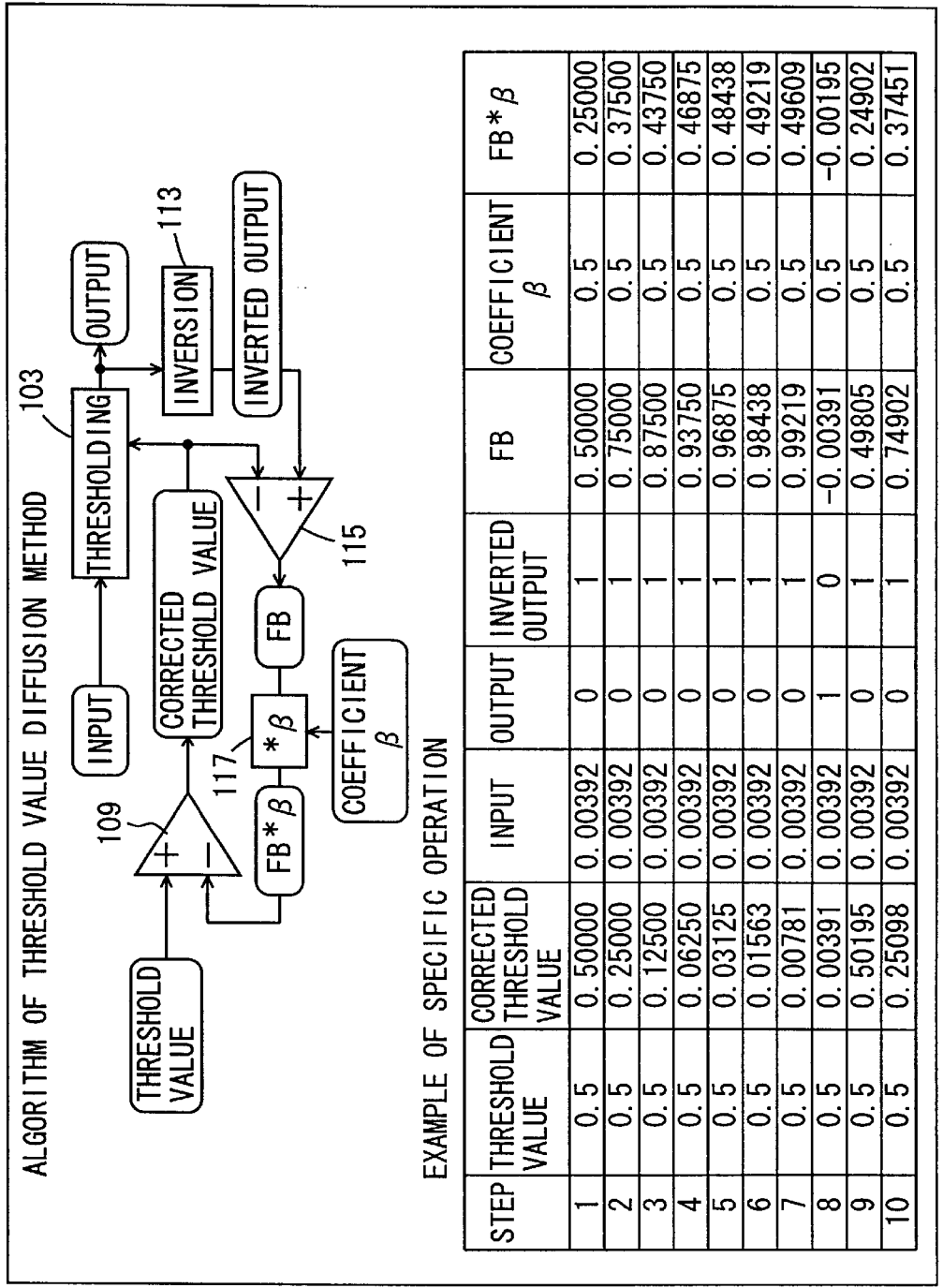
FIG. 23 represents specific example of operation in accordance with the threshold value diffusion method.

FIG. 23 represents a specific example of operation in accordance with the threshold value diffusion method. Referring to the figure, how the numerical values in the apparatus are changed by subtracting unit 109 and 115, threshold value processing unit 103, coefficient multiplying unit 117 and inverting unit 113 are represented.

More specifically, how the outputs of subtracting unit 109 (corrected threshold value or modified threshold value Mod th), threshold processing unit 103, inverting unit 113 (inverted output), subtracting unit 115 (FB) and coefficient multiplying unit 117 (FB*β) change in accordance with the initial threshold value (threshold value th), input value (input) and coefficient β are represented. Here, inlet period of threshold value diffusion will be estimated in accordance with the description in Toshiaki KAKUTANI, "An Improved Error Diffusion Method Suppressing Image Distortion", Journal of Japan Photograph Society, Vol. 60, No. 6, pp. 353–356.

Assuming that one gradation is 1/255 (=0.00392) of the maximum output value, and that the threshold value is one-dimensionally diffused in one direction, the corrected or modified threshold value (Mod th) is reduced by half in every one step, as can be seen from the example of calculation of FIG. 23. The corrected threshold value reaches to 1/255 of the maximum value just in eight steps. This is almost equal to the desirable inlet period ($(255)^{1/2}/2=8$). In the error diffusion method, it takes 128 steps, and therefore the threshold value diffusion method is very much advantageous as compared with the error diffusion method. It should be noted, however, that the threshold value is actually diffused in two-dimensional manner, and therefore, the inlet period becomes longer as compared with one dimensional diffusion in one direction.

The results of specific image processing will be described in the following.

Figure 24:
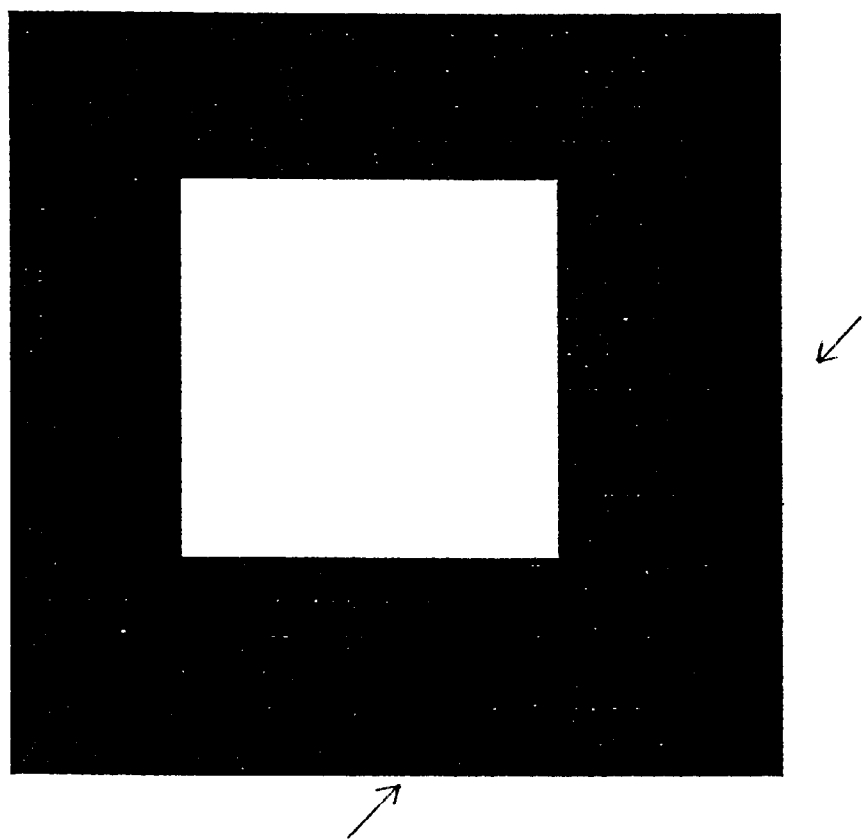
FIG. 24 represents an image to be processed.

FIG. 24 represents an image which is an object of processing. The image has 256 gradations of 0 to 255. The black portion in the image represents a portion having the density of 251/255, and the central square portion represents a portion of the density of 4/255. Further, line having the density of 230/255 is drawn at portions represented by two arrows.

The image shown in FIG. 24 is binarized by the image forming apparatus using the threshold value diffusion method, in accordance with the first embodiment of the present invention described above. The initial threshold value was set to 0.5 and the coefficient β was set to 0.5. For the diffusion of the threshold value, a matrix of FIG. 2 was used.

Figure 25:
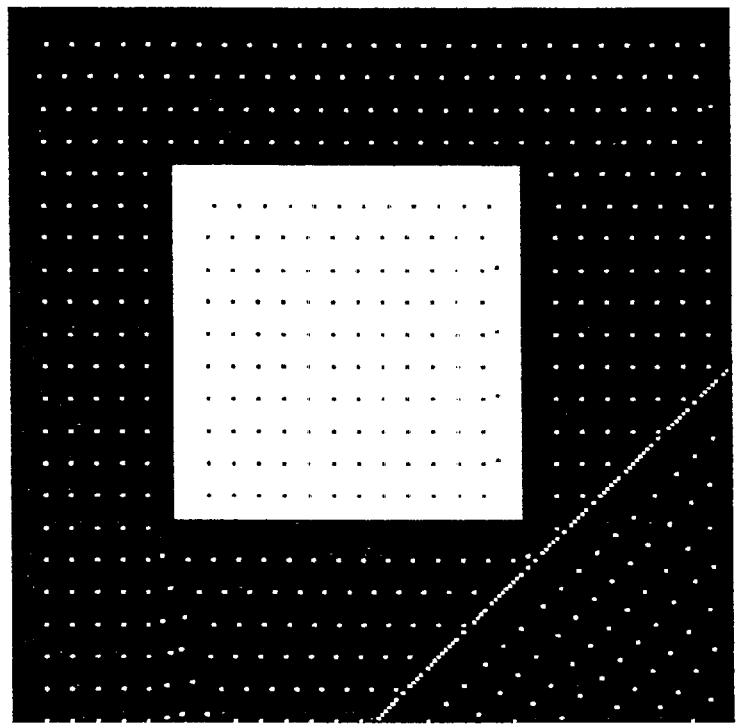
FIG. 25 shows a result of processing in accordance with the threshold value diffusion method.

FIG. 25 is the result of image processing. As can be seen from the figure, when the threshold value diffusion method is employed, delay in dot generation or tailing is not much observed.

Figure 26:
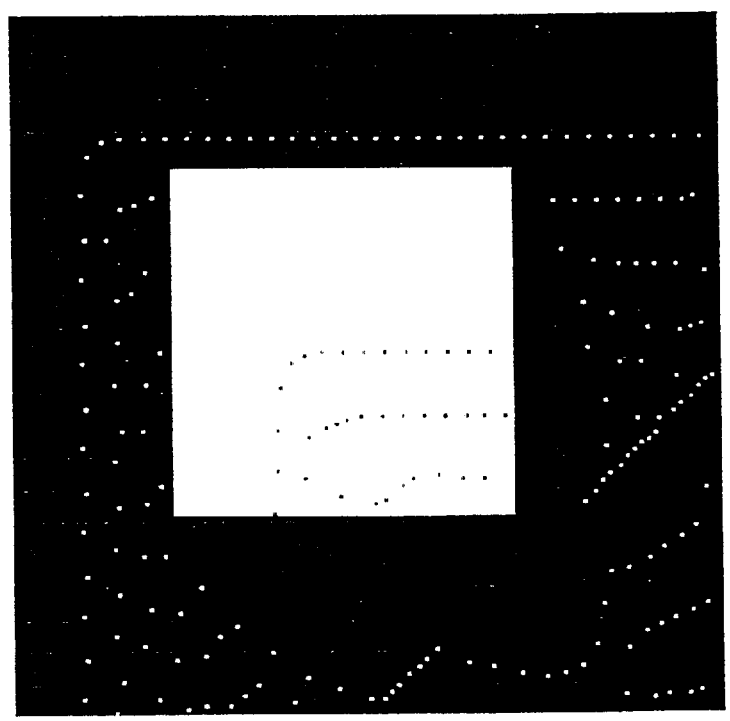
FIG. 26 shows the result of processing in accordance with the error diffusion method.

FIG. 26 represents the result of processing of the image shown in FIG. 24 in accordance with the error diffusion method (with the threshold value of 0.5, and using the same matrix as FIG. 2 for error diffusion). As can be seen from the figure, when the error diffusion method is used, delay in dot generation and trailing are much noticeable. Thus it can be understood that the threshold value diffusion method is superior to the error diffusion method.

Figure 27:
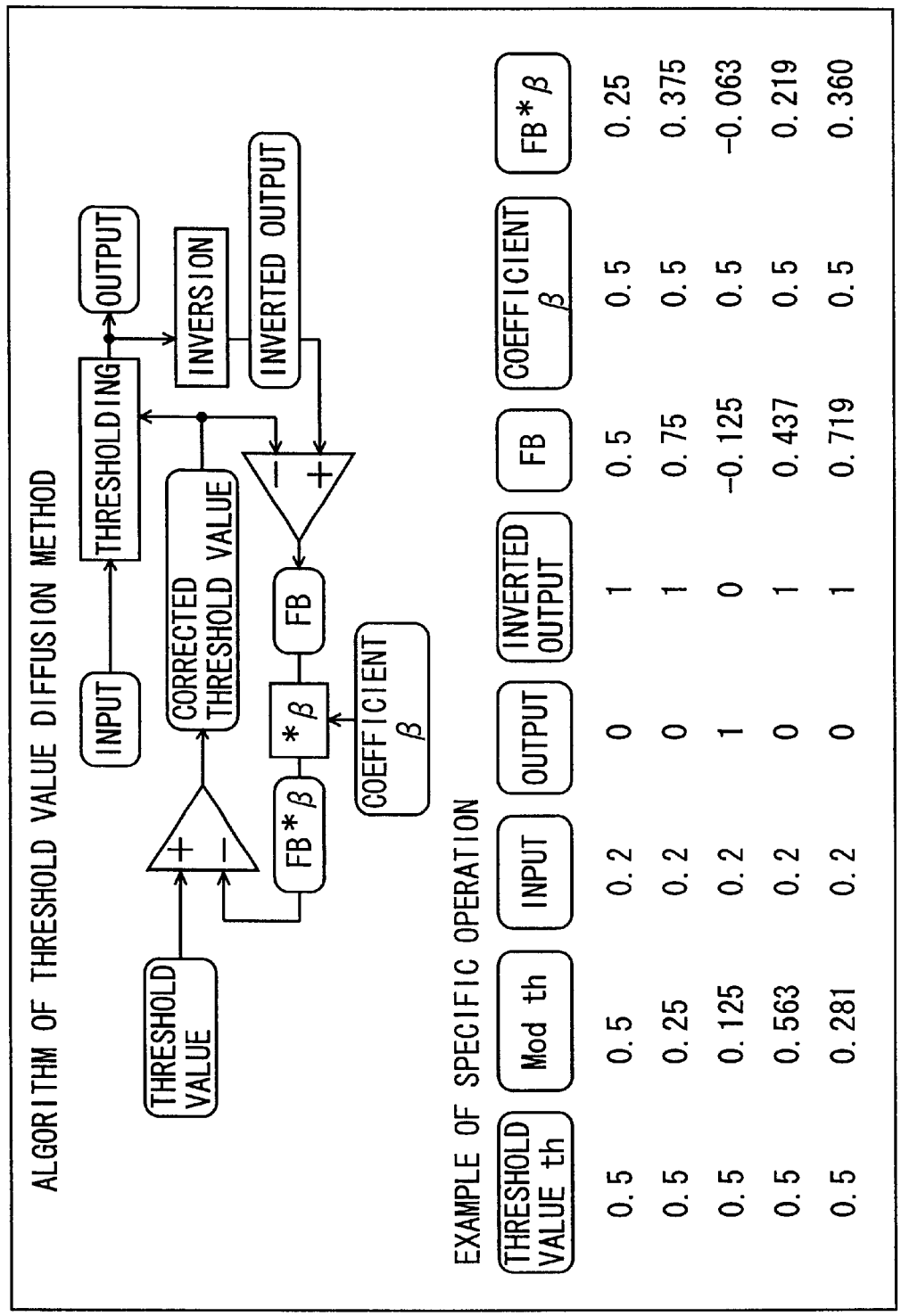
FIG. 27 represents the result of the threshold value diffusing process.
Figure 28:
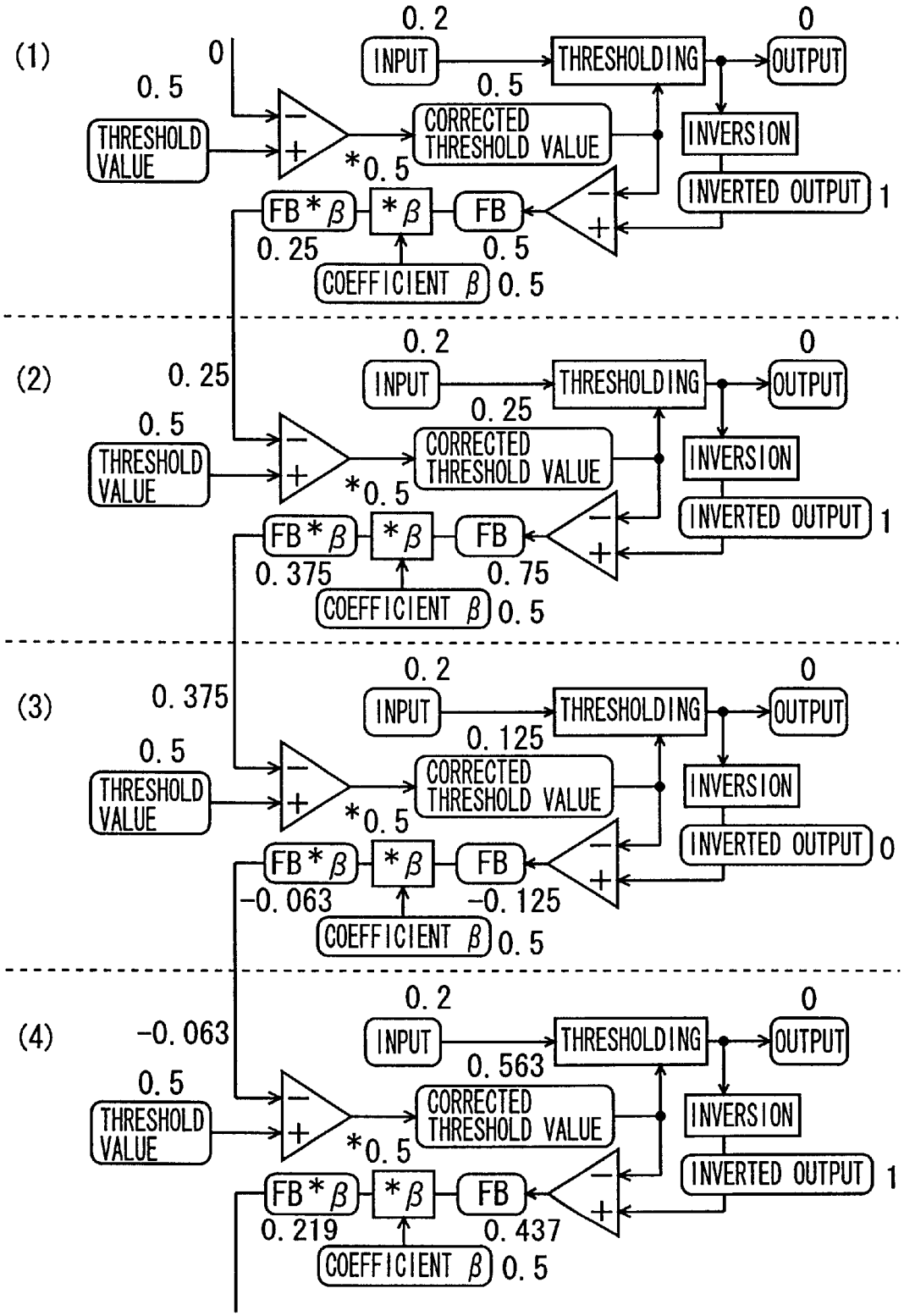
FIG. 28 shows, step by step, the results of the threshold value diffusing process.

FIGS. 27 and 28 represent, for reference, results of threshold value diffusion process when the initial threshold value was set to 0.5 and the input value was set to 0.2. FIG. 28 shows flow of various numerical values in four steps (1) to (4).

Modification

In place of the structure shown in FIG. 1, the configuration of FIG. 19 may be used for the threshold value diffusion method. In the configuration of FIG. 19, the initial threshold value Th (x) is modulated by the input value. Here, it is necessary to adjust feed back coefficient β.

Figure 20:
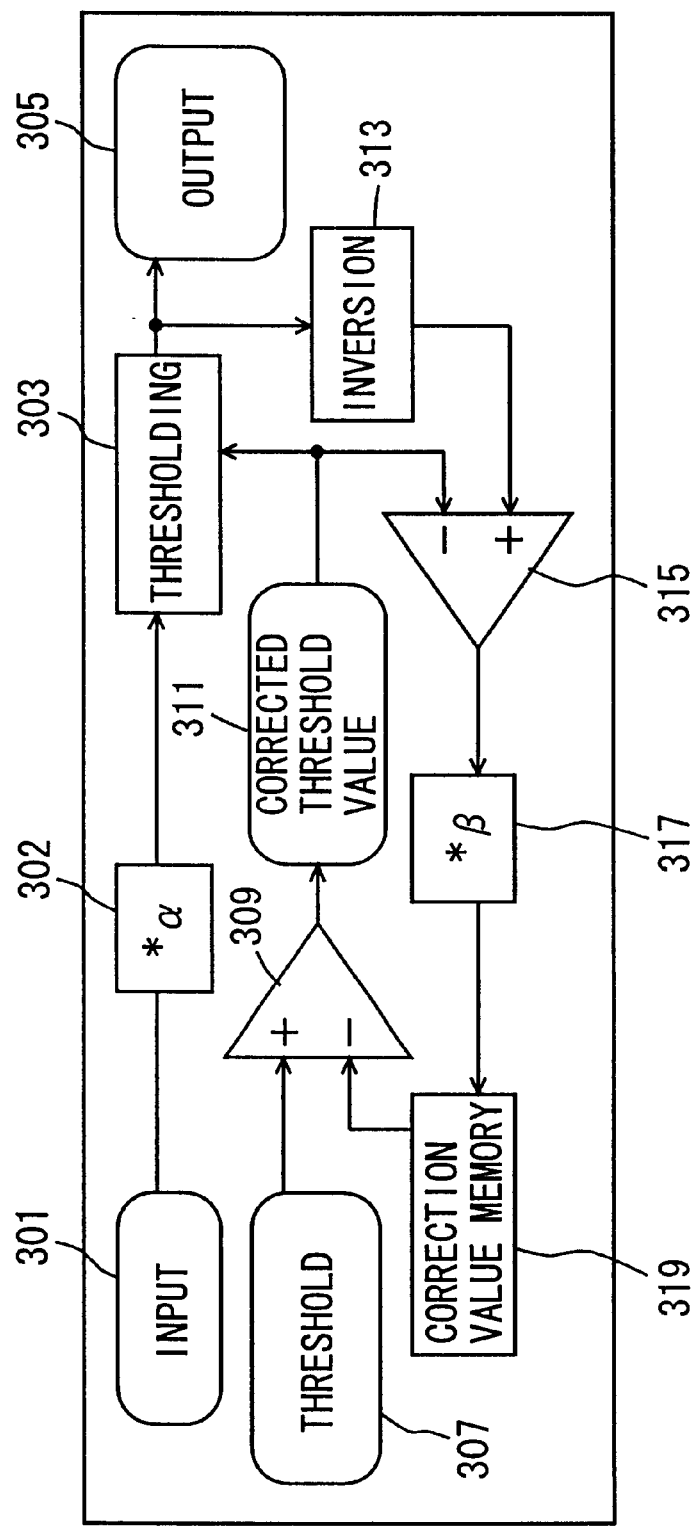
FIG. 20 shows a modification of the apparatus shown in FIG. 1.

Further, in place of the configuration shown in FIG. 1, the configuration shown in FIG. 20 may be used. This configuration includes a multiplying unit 302 in which the input value is multiplied by a coefficient α. By the coefficient α, the degree of the effect of binarization can be controlled, and therefore, it becomes possible to increase the degree of edge enhancement, for example. In this case also, the value of optimal feed back coefficient β changes dependent on the coefficient α, and therefore, it is necessary to adjust the feed back coefficient β.

Further, the configuration of the apparatus shown in FIG. 19 may be added to the configuration of the apparatus shown in FIG. 20, so that modulation of the initial threshold value Th (x) by the input value and the process of multiplying the input value by coefficient α may be performed simultaneously.

As described above, the threshold value diffusion method functions to reproduce with priority the local 1st and higher order components of the image input value. Nevertheless, it is also possible to reproduce local 0th component by parameter setting. Further, as the algorithm, feed back similar to that of the error diffusion method is used, and therefore the texture of the output image has blue noise characteristic similar to the error diffusion method. Further, load is also comparable to that of the error diffusion method.

By the threshold value diffusion method, it becomes possible to eliminate the disadvantage of the error diffusion method that dots tend to appear in a line at a background portion of near white or black, while maintaining the output image quality comparable to that of the error diffusion method. Further, the threshold value diffusion method additionally has various advantageous such as reproduction of low contrast edge component.

In reproducing halftone by binarization, it is expected that visual characteristic will be of greater consideration. In that case, what is important is the balance between the overall characteristic of the observed image and the local characteristic. In other words, it becomes necessary to reproduce overall gradation while maintaining local correlation within the image. The reason for this is that a viewer of the image naturally takes a balance in his or her mind that both characteristics are exhibited to the maximum. Therefore, a method which can control and simply reproduce the local 0th order component and 1st and higher order components of the input image will be more necessary. The threshold value diffusion method contributes to such a method of image formation satisfying this request.

Second Embodiment

In the image processing apparatus in accordance with the second embodiment, a plurality of image forming apparatuses in accordance with the first embodiment are used to reduce gradations of a multi-value image consisting of a plurality of color components.

Here, the object of processing is a color image consisting of four colors, that is, C (cyan), M (magenta), Y (yellow) and K (black) for a printer.

Figure 21:
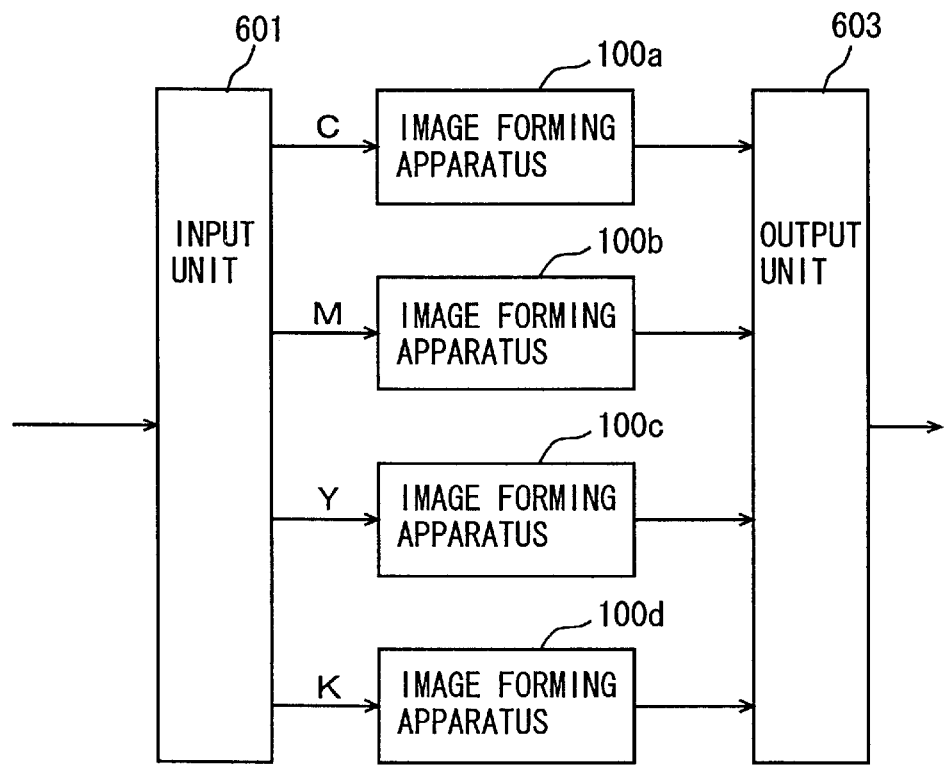
FIG. 21 is a block diagram representing a configuration of an image processing apparatus in accordance with a second embodiment of the present invention.

FIG. 21 is a block diagram representing a configuration of an image processing apparatus in accordance with the present embodiment. Referring to the figure, the image processing apparatus includes an input unit 601 receiving as an input, a color image data, dividing the data into multi-value image of C, M, Y and K and outputting the same, image forming apparatuses 100a to 100d corresponding to C, M, Y and K, respectively, and an output unit 603 superposing and outputting binary image output from image forming apparatuses 100a to 100d.

As one configuration of image forming apparatuses 100a to 100d, the configuration of the first embodiment or modification thereof may be used.

In each of image forming apparatuses 100a to 100d shown in FIG. 21, different feed back coefficients β may be set. More specifically, the feed back coefficient may be changed color by color, considering the effect when the four colors are superposed.

Further, initial threshold value Th (x) can also be set freely. More specifically, appropriate four different patterns may be prepared and used as initial threshold values. By such approach, advantageous effect of color reproduction when four color image data are superposed can be attained.

More specifically, processing is possible to prevent noise or the like caused by interference when the colors are superposed. For example, in a process utilizing a dither screen as initial threshold value Th (x), four different screen patterns may be prepared by changing the pitch, angle and the like of the screen for respective colors. In this manner, the present embodiment allows for a process particular to a color image.

As shown in FIG. 21, independent processing of four color image data color by color is desirable in view of simplified processing, though such processing is not a necessity.

For example, the input may be considered as a set of vectors in four-dimensional color space, and threshold value diffusion may be performed in the four-dimensional space. In that case, the feed back coefficient will be set as a vector having components of respective dimensions. Further, the initial threshold value is also set as a function, of which output value is a vector (initial threshold value vector Th (x)).

Adoption of the threshold value diffusion method provides in the second embodiment the advantages as described with respect to the first embodiment. As the method is applied to a color image in an appropriate manner as in the second embodiment, it becomes possible to control relation of color emitting dot arrangements of respective colors on the output medium. This contributes to refined color reproduction. In the present embodiment, for example, such color reproduction is realized by setting such a pattern that does not interfere the initial threshold values of respective colors with each other.

Further, by independently adjusting the feed back coefficient (β) of each color, it is possible to control gradation of each color and to adjust the color appearance itself of the output image. As the threshold value diffusion method is applied to the color image, degree of freedom of new image quality adjustment is attained.

Further effects of adopting threshold value diffusion method in color image processing includes variable setting of coefficient and initial threshold value color by color, which enables adjustment operation with respect to dot arrangement at the time of output. Further, the effect of gradation reproduction can be attained color by color at the time of output, and hence color appearance can be adjusted.

By appropriately performing these operations, more satisfactory color reproduction, including optimization of color appearance and sharpness of color emission itself of the output color image, can be attained.

The invention as described above is applicable to an apparatus in which a digitized full color gradation image is separated into color components which can be output, and in which binary output is provided for each color component. Particularly, a color image output apparatus such as a color printer outputs color materials such as an ink, in accordance with the pixel position on a sheet of paper, and output of the color material of each color components is in most cases restricted by two values, that is, on/off. In such a case, processing (binarization) representing halftone together with color reproduction such as hue and saturation are performed by adjusting dot arrangements, area and so on of respective color materials. The present invention can be implemented in such a process, and exhibits superior effects.

More specifically, the present invention enables binarization which can be performed with relatively simple calculation and not so large a memory, while gradation of an original color image is sufficiently reproduced and image quality, such as color reproduction, can be improved.

Modification

Figure 22:
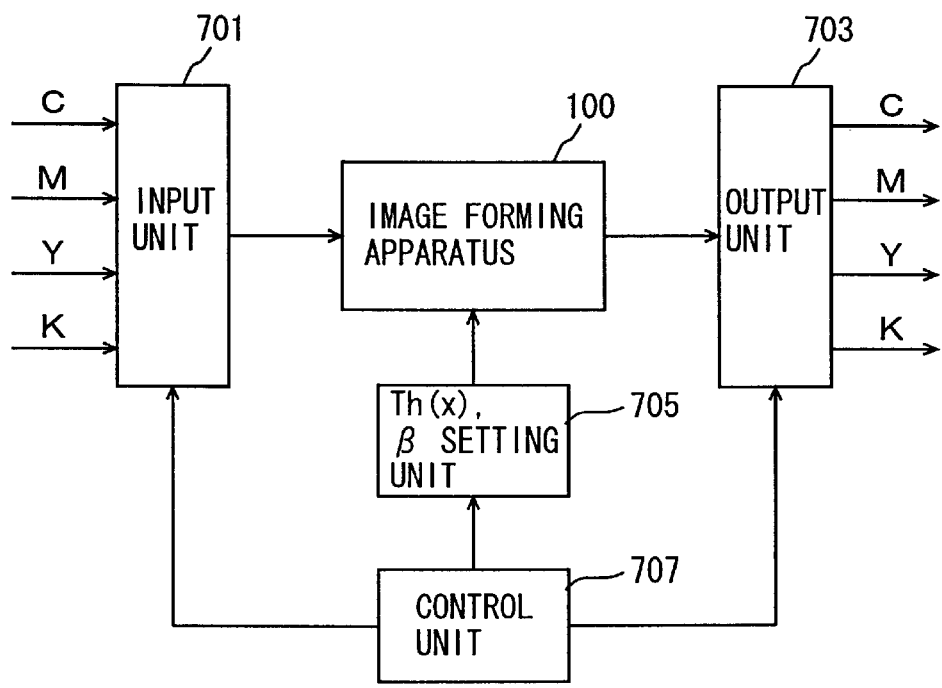
FIG. 22 is a block diagram showing a modification of the apparatus of FIG. 21.

The apparatus configuration shown in FIG. 21 maybe modified to such a configuration as shown in FIG. 22.

Referring to FIG. 22, the image processing apparatus includes an input unit 701 receiving as inputs image data of C, M, Y and K, an image forming apparatus 100 successively receiving as inputs the image data of C, M, Y and K from input unit 701 for forming a binary image, an output unit 703 outputting the output data from image forming apparatus 100 as C, M, Y and K image data, a setting unit 705 for setting the initial threshold value Th (x) and feed back coefficient β for image processing of C, M, Y and K, respectively, and a control unit 707 for overall control of the apparatus.

In this apparatus, successively input C, M, Y and K image data are processed serially by one image forming apparatus 100 and output. Further, the threshold value and the feed back coefficient are changed in accordance with respective color components. By the configuration of the apparatus in this manner, an image processing apparatus which operates in the similar manner as the apparatus of FIG. 21 can be provided.

Third Embodiment

Figure 29:
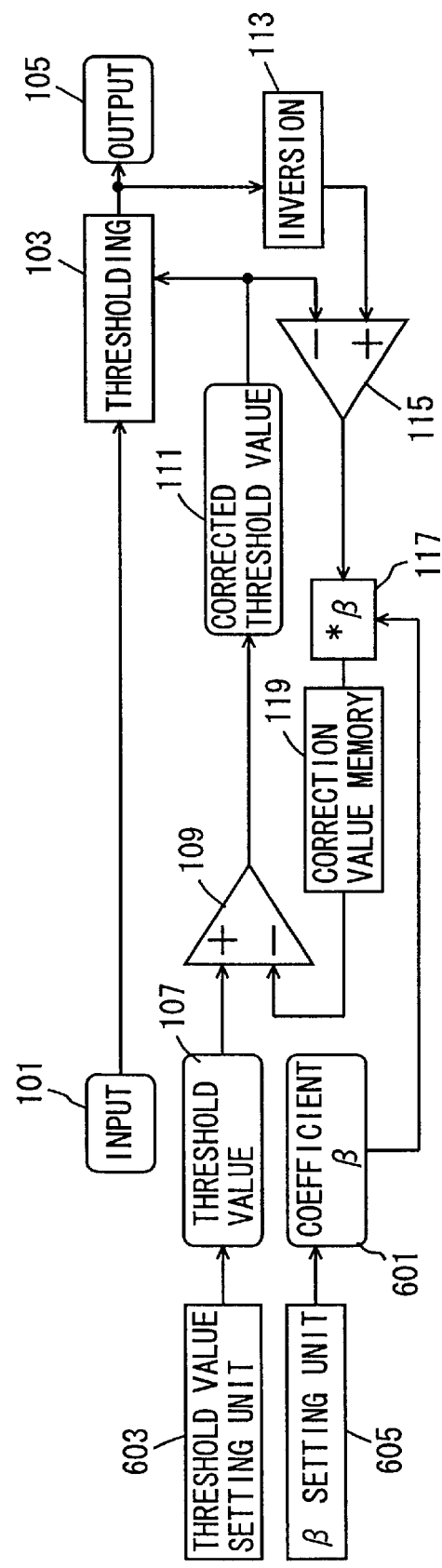
FIG. 29 is a block diagram representing a configuration of an image forming apparatus in accordance with a third embodiment of the present invention.

FIG. 29 is a block diagram representing a configuration of an image forming apparatus in accordance with the third embodiment of the present invention. Referring to the figure, the image forming apparatus includes, as in the first embodiment, an input unit 101, a thresholding unit 103, a binary image output unit 105, an inverting unit 113, an initial threshold value generating unit 107, a subtracting unit 109, a corrected threshold value output unit 111, a subtracting unit 115, a coefficient multiplying unit 117 and a correction value memory 119.

In the present embodiment, the image forming apparatus further includes a coefficient β input unit 601 inputting coefficient β, initial threshold value th setting unit 603 and a coefficient β setting unit 605. More specifically, the image forming apparatus is characterized in that at least one of the initial threshold value th and the coefficient β is set by the user. This allows control of γ characteristic (image reproduction characteristic) in the image reproduction.

Figure 30:
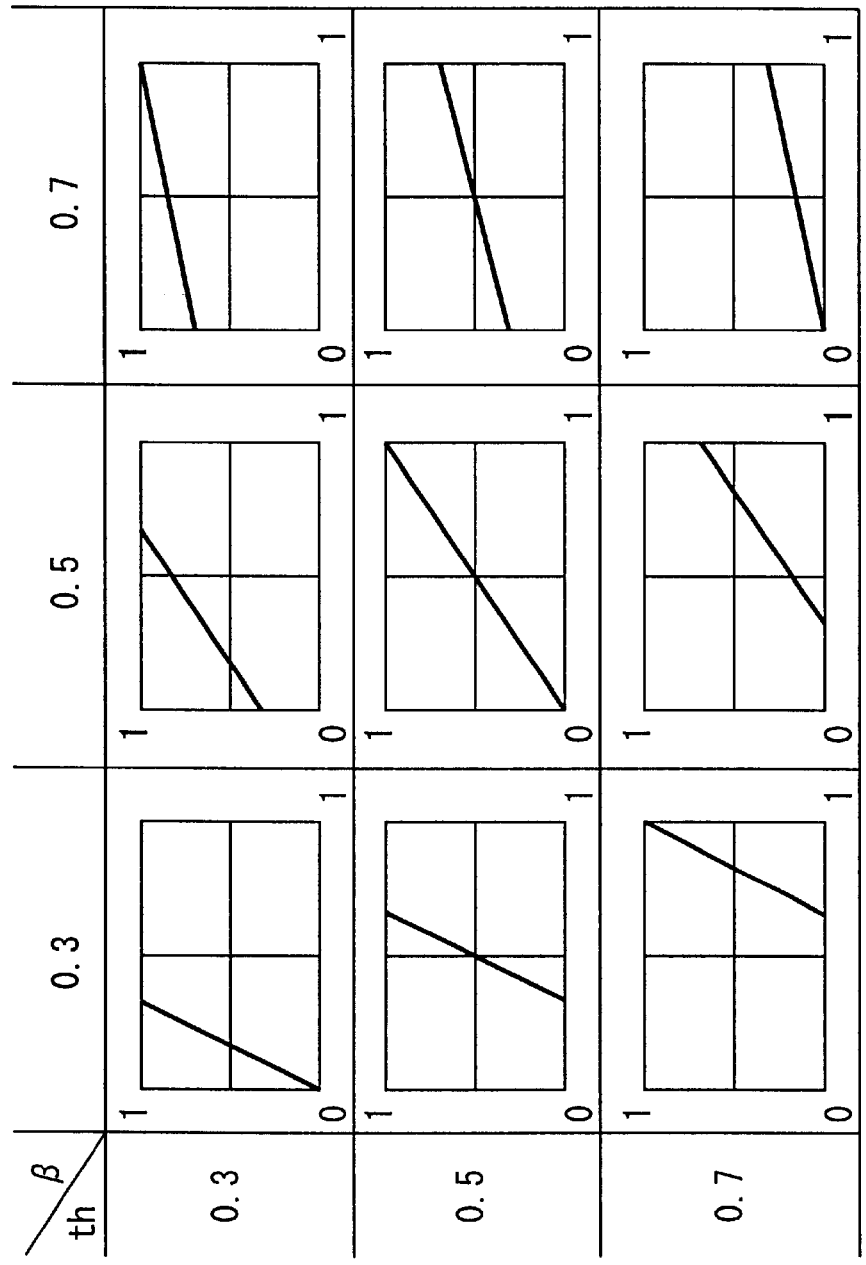
FIG. 30 represents γ characteristic when initial threshold value th and coefficient β are changed.

FIG. 30 is an illustration representing γ characteristic when the initial threshold value th and the coefficient β are changed. For respective initial threshold values th and coefficient B, the abscissa of the graph shown represents the input value, and the ordinate represents the output value.

In the conventional error diffusion method, in order to vary γ characteristic, it has been necessary to use a separate correction function operating unit, a look up table or the like for correcting the characteristic. When the threshold value diffusion method is used, the γ characteristic can be controlled simply by changing th or β.

Fourth Embodiment

FIG. 31 is a block diagram representing a configuration of the image forming apparatus in accordance with the fourth embodiment of the present invention. Referring to the figure, the image forming apparatus includes, as in the first embodiment, an input unit 101, a thresholding unit 103, a binary image output unit 105, an inverting unit 113, an initial threshold value generating unit 107, a subtracting unit 109, a corrected threshold value output unit 111, a subtracting unit 115, a coefficient calculating unit 117 and a correction value memory 119.

In the present embodiment, the image forming apparatus further includes an initial threshold value th setting unit 603 setting the initial threshold value th, a coefficient k output unit 609 for outputting a coefficient k for calculating the coefficient β, a β calculating unit 611 for calculating β for each pixel based on input value of input unit 101, initial threshold value th and coefficient k, and a k setting unit 607 for setting the coefficient k.

Figure 32:
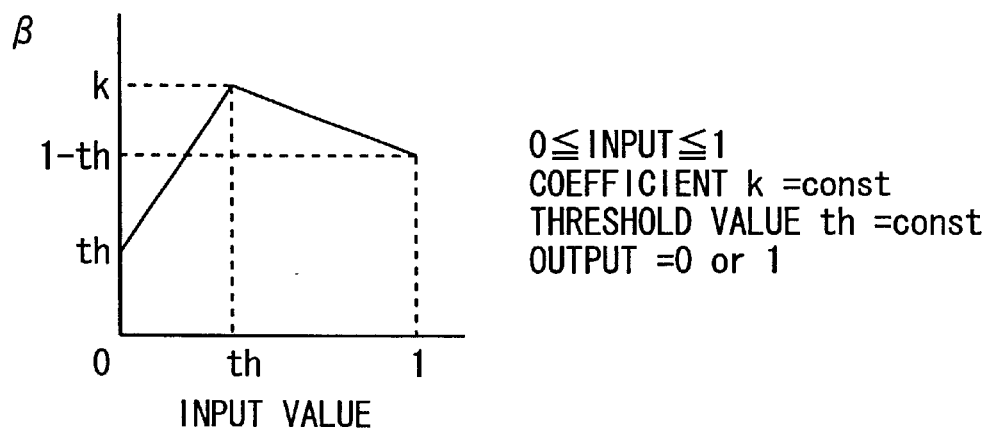
FIG. 32 is an illustration representing the method of calculating β by β calculating unit 611.

FIG. 32 is a graph representing the method of calculating β by the β calculating unit 611. As can be seen from the figure, when the input value from input unit 101 is "0", the initial threshold value th is set as the value of β. When the input value is equal to th, k is set as the value of β. When the input value is "1", 1-th is set as the value β.

Figure 33:
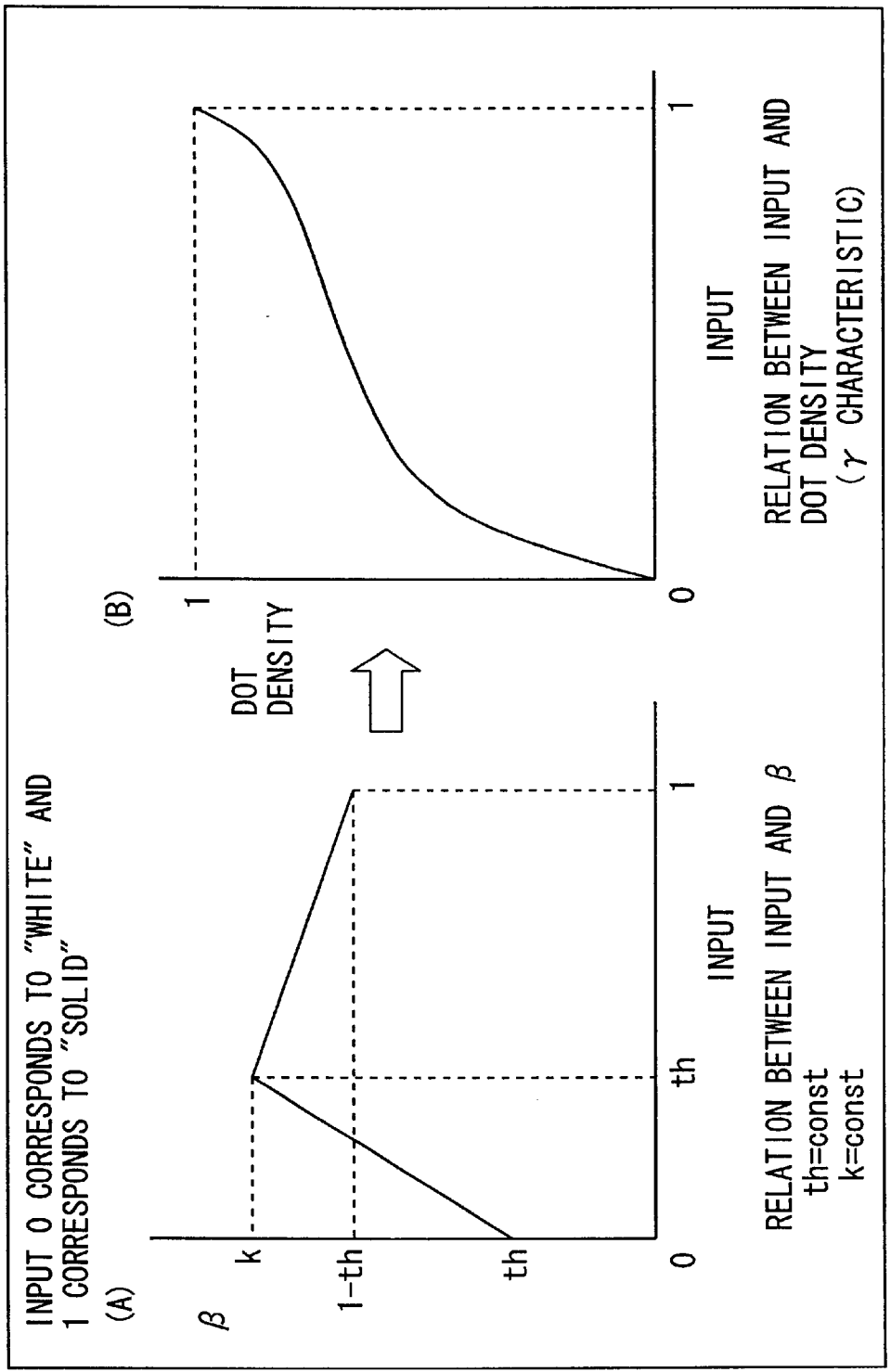
FIG. 33 includes graphs representing an effect attained by the fourth embodiment of the present invention.

FIG. 33 represents the effect of the present embodiment. Referring to the figure, when the value β is changed in accordance with the input value as shown in (A), the apparatus comes to have such γ characteristic in that when the input is 0 (minimum level), the output (dot density) attains 0 and when the input is 1 (maximum level), the output attains 1, as shown in (B).

More specifically, in order to represent white or solid color, in many cases it is necessary to represent dot density 0 (=no dot is provided) or dot density 1 (=dot density 100%). Further, in order to ensure continuous gradations, it is necessary that the γ characteristic is continuous and uniform (increases or decreases uniformly). The γ characteristic required in the halftoning process is not always linear.

The present embodiment realizes an image processing which satisfies such requirement. More specifically, when the coefficient β is set to β=th if the input is 0, such a characteristic can be attained in that when the input is 0 (=minimum value), output dot density attains 0, and when the input is at an intermediate level, the output increases uniformly. Similarly, when the coefficient is set as β=1-th if the input is 1 (=maximum value), the output dot density attains to 1 when the input is 1. Further, when the input is other than 0 or 1, β and th can be set continuously and freely with respect to the input. In the present embodiment, a parameter k is arbitrarily determined, so that the input and the value β are related to each other. By this configuration, it becomes possible to attain necessary characteristic in a simple manner, by simply changing the values th and k.

Figure 34:
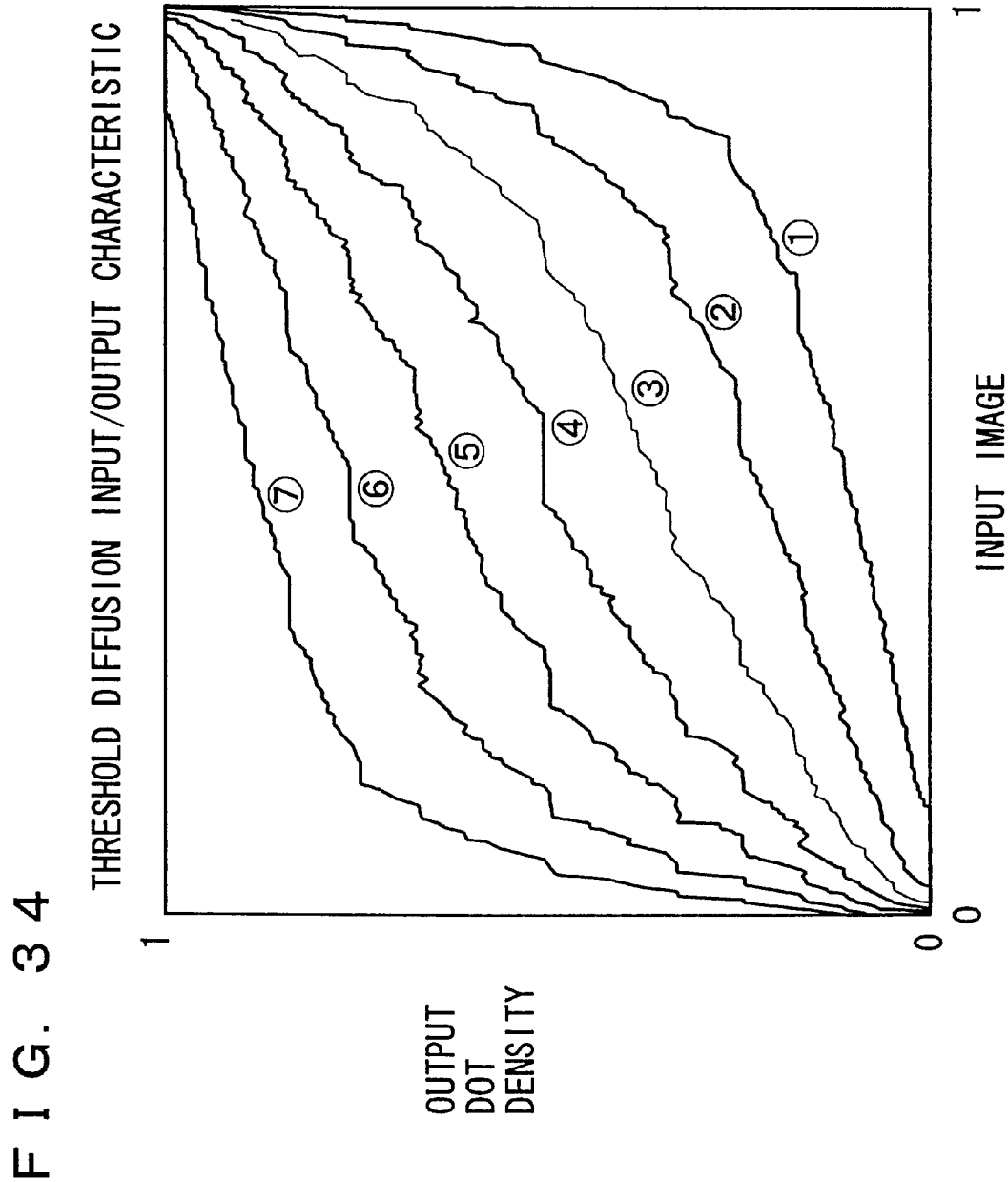
FIG. 34 represents change in γ characteristic when th is changed with k=0.7.

FIG. 34 is a graph representing the change in γ characteristic when th is changed with k=0.7. As can be seen from the graph, by changing the value th, lightness of the output image as a whole can be changed.

Figure 35:
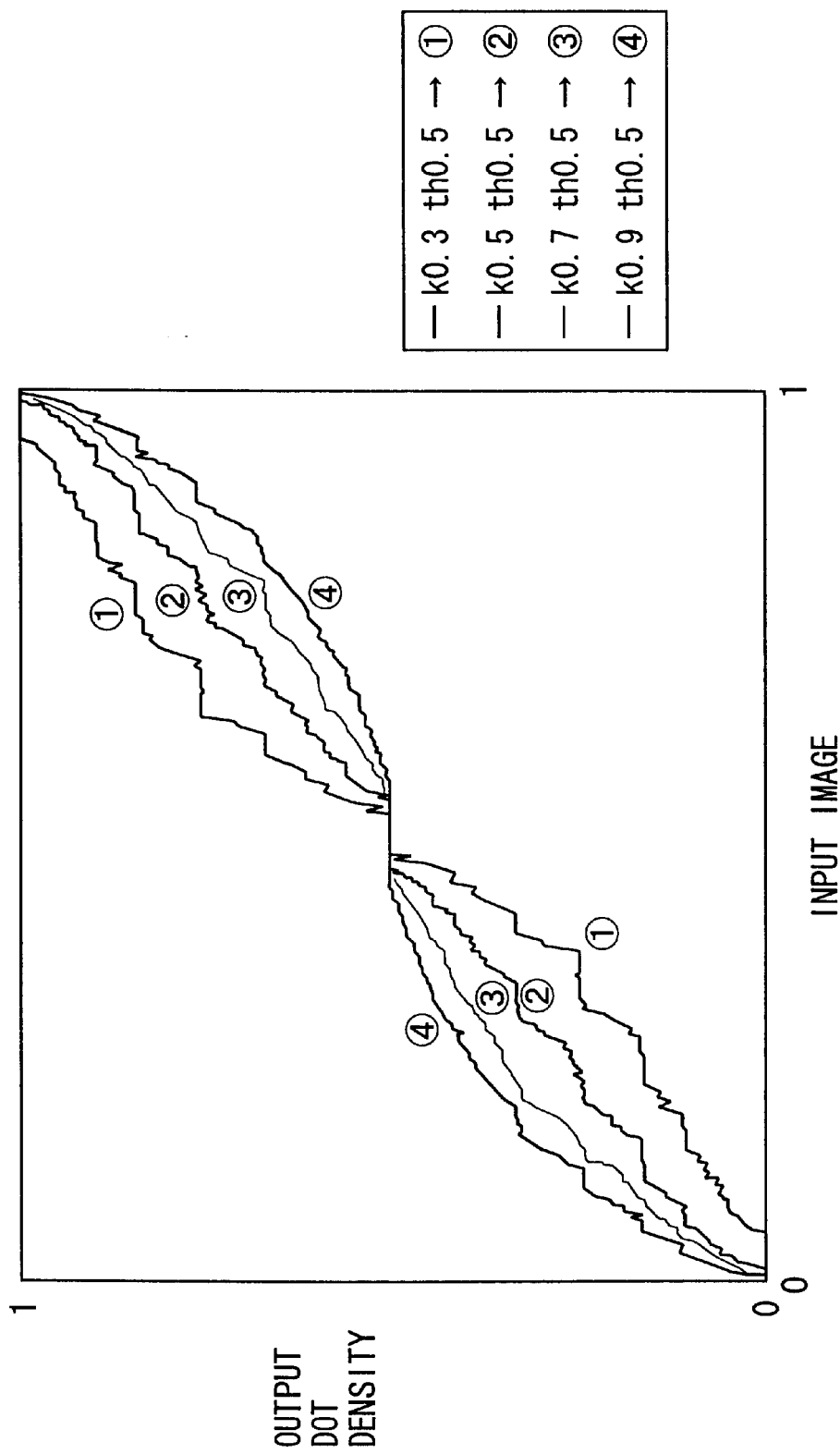
FIG. 35 shows change in γ characteristic when the value k is changed with th=0.5.

FIG. 35 is a graph representing the change in γ characteristic when the value k is changed, with th=0.5. As can be seen from the figure, by changing the value k, contrast of the output image can be changed.

Application

Figure 36:
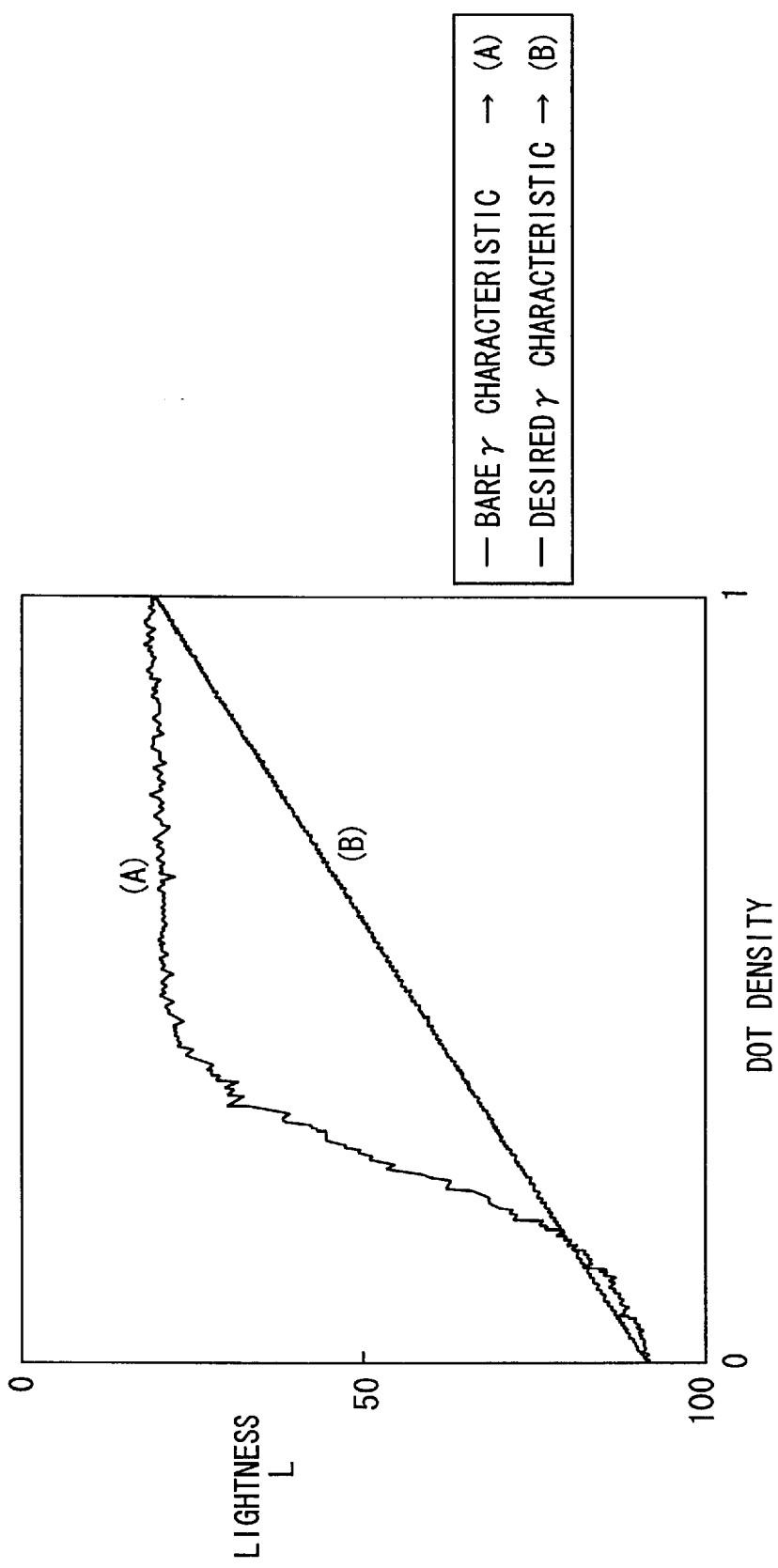
FIG. 36 represents a relation between dot density and lightness of a laser printer.
Figure 37:
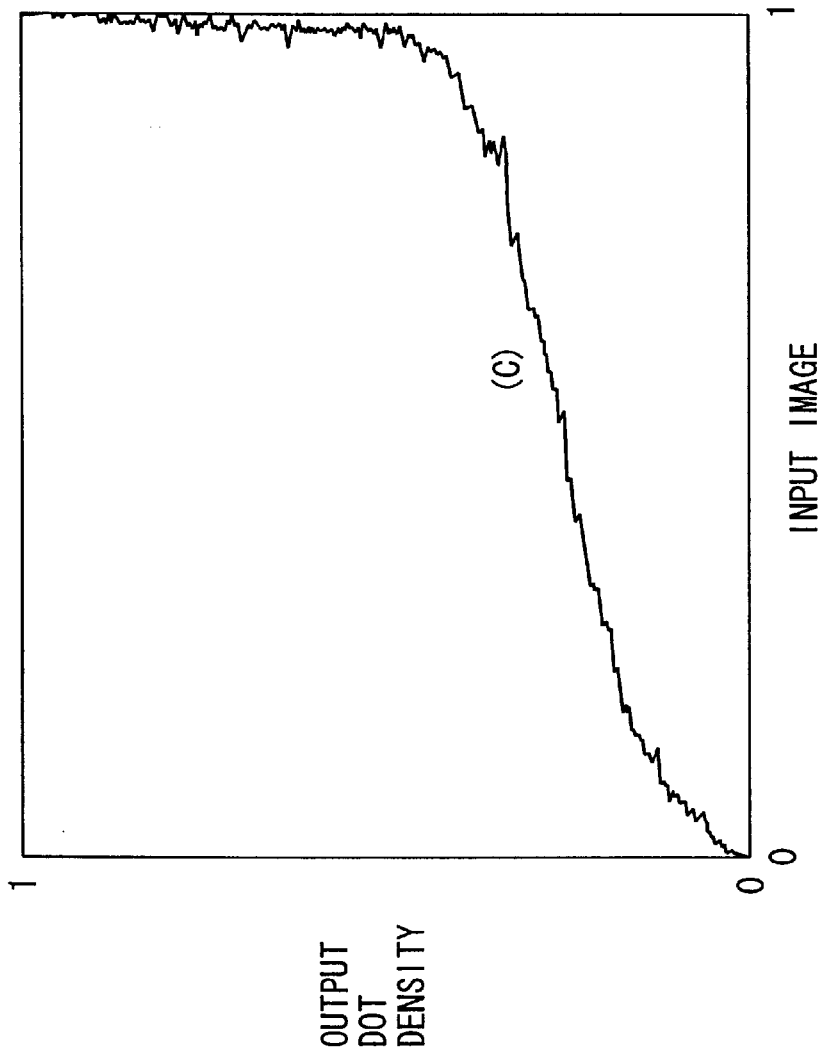
FIG. 37 shows preferable γ characteristic for the printer of FIG. 36.

FIG. 36(A) represents characteristic of a laser printer, representing the relation between printed dot density and lightness L (how it appears to human eyes). As is apparent from the figure, the dot density and lightness L are not in linear relation. If such a characteristic as represented in FIG. 37(C) can be obtained in the process of image processing, linear characteristic of dot density and the lightness L such as shown in FIG. 36(B) will be obtained.

Figure 38:
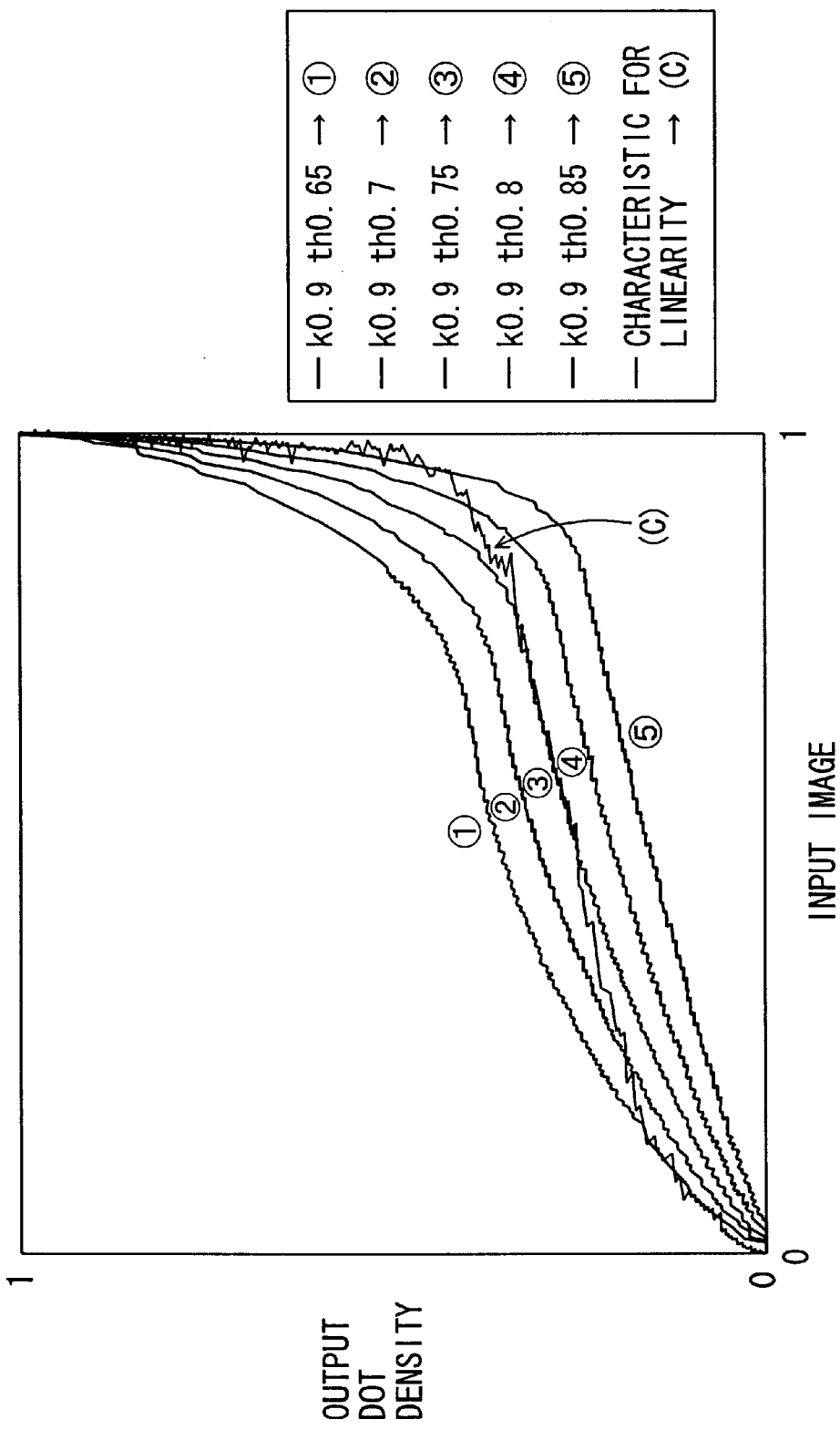
FIG. 38 is a graph representing change in γ characteristic when th is changed.
Figure 39:
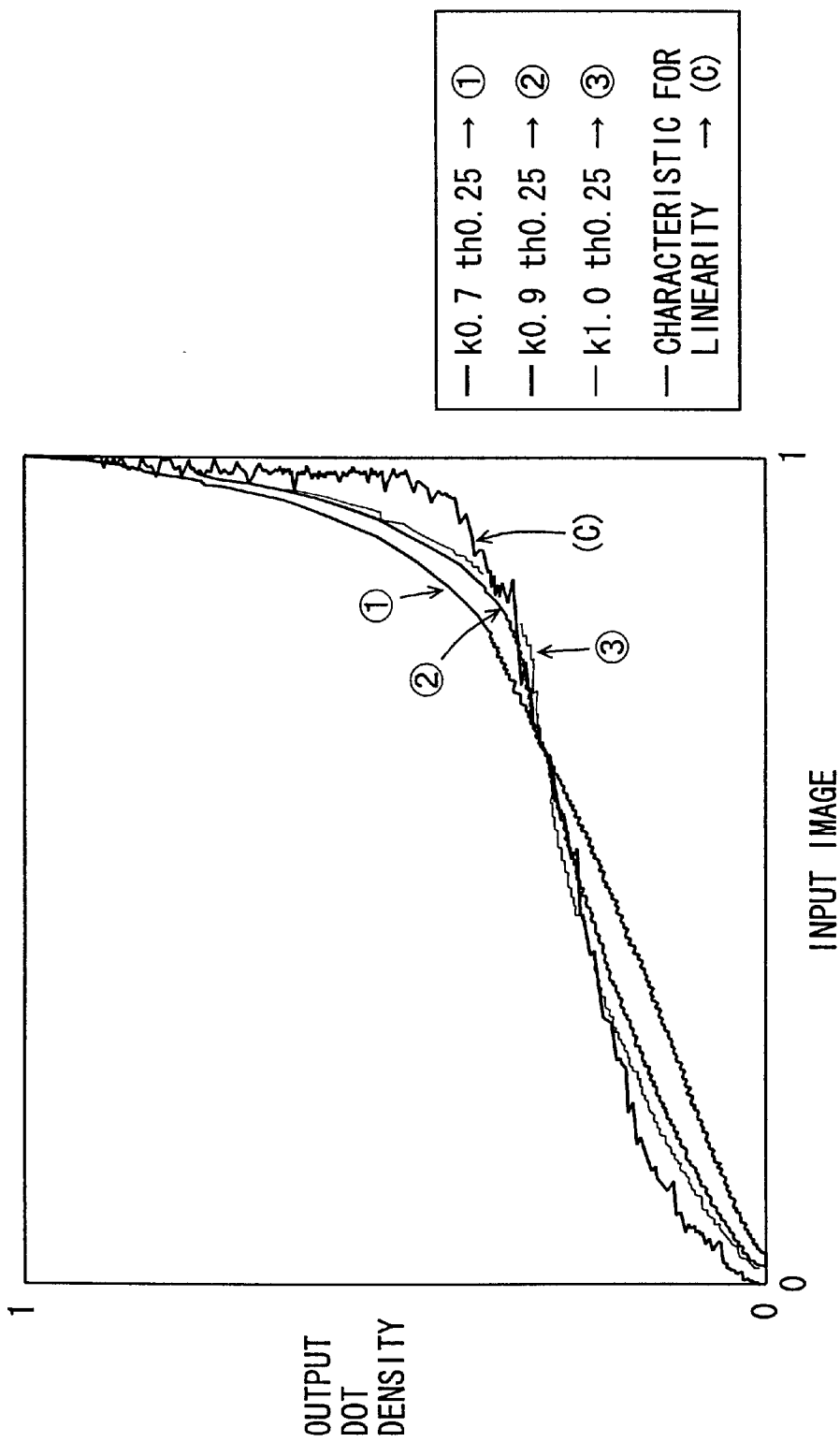
FIG. 39 is a graph representing change in γ characteristic when k is changed.

FIGS. 38 and 39 represent relations between the input image and the output dot density obtained when the values k and th are changed. FIGS. 40 and 41 represent relation between input image and output lightness when γ characteristic is provided by adjusting the values k and th, when the image forming apparatus in accordance with the fourth embodiment is applied to a laser beam printer which has such a characteristic as shown in FIG. 36(A).

As can be seen from FIG. 40(D), when the error diffusion method only is used without γ characteristic correction, desirable γ characteristic such as shown in FIG. 36(B) cannot be attained. When the threshold value diffusion method is applied, however, γ characteristic closer to the desired γ characteristic (① to ③ of FIG. 40 and ① to ③ of FIG. 41) can be attained by adjusting the values k and th.

Further, weight coefficient shown in FIG. 2 may be changed based on the change in the input value.

In the present embodiment, coefficient β and weight coefficient are changed based on the input value. The values th, β and weight coefficient may be changed in accordance with the value of the threshold value diffusion algorithm (output value, inverted output value, feed back value, corrected threshold value and the like).

Further, the values th, β and the weight coefficient may be changed dependent on the type of the image. The type of the image refers to image color (C, M, Y, K or the like), whether the image is a color/monochrome image, whether the object image is an image or text, and whether the image is a natural image or a graphic image, and so on.

Conventionally, when digital halftoning technique utilizing error diffusion method, for example, is used and image data in which C, M, Y and K have the same data (as is often the case of graphic image data) is to be processed, same dot patterns are generated, impairing image quality. Such a problem can be solved by differently setting any of th, β and the weight coefficient for C, M, Y and K.

Further, color emission characteristic generally differs in respective color materials, that is, C, M, Y and K. Therefore, in order to attain the preferable characteristic, it has been necessary to perform correction function operation or to prepare a look up table, for correcting characteristic of respective colors. By the threshold diffusion method, however, preferable characteristic of C, M, Y and K can be attained respectively, simply by setting th and β, for example, which are most suitable for each color.

Further, preferable γ characteristic differ dependent on the image type. For example, in a text image screen, high contrast is necessary. By the threshold value diffusion method, high contrast can be attained by setting β small. In a monochrome natural image, generally, high key image plane is preferred, and therefore what should be done is to set th to a small value. Generally, one image forming means must cope with images of various types, and it is preferable to attain different γ characteristics for respective image data. Such demands can be met simply by setting the values th, β and the weight coefficient in accordance with the types of the images.

Though correction value memory 119 is provided in a succeeding stage of feed back coefficient multiplying unit 117, it may be positioned at a portion represented by (*) of FIG. 31.

Further, the weight shown in FIG. 2 may be made variable, in accordance with the user's operation.

Fifth Embodiment

Figure 42:
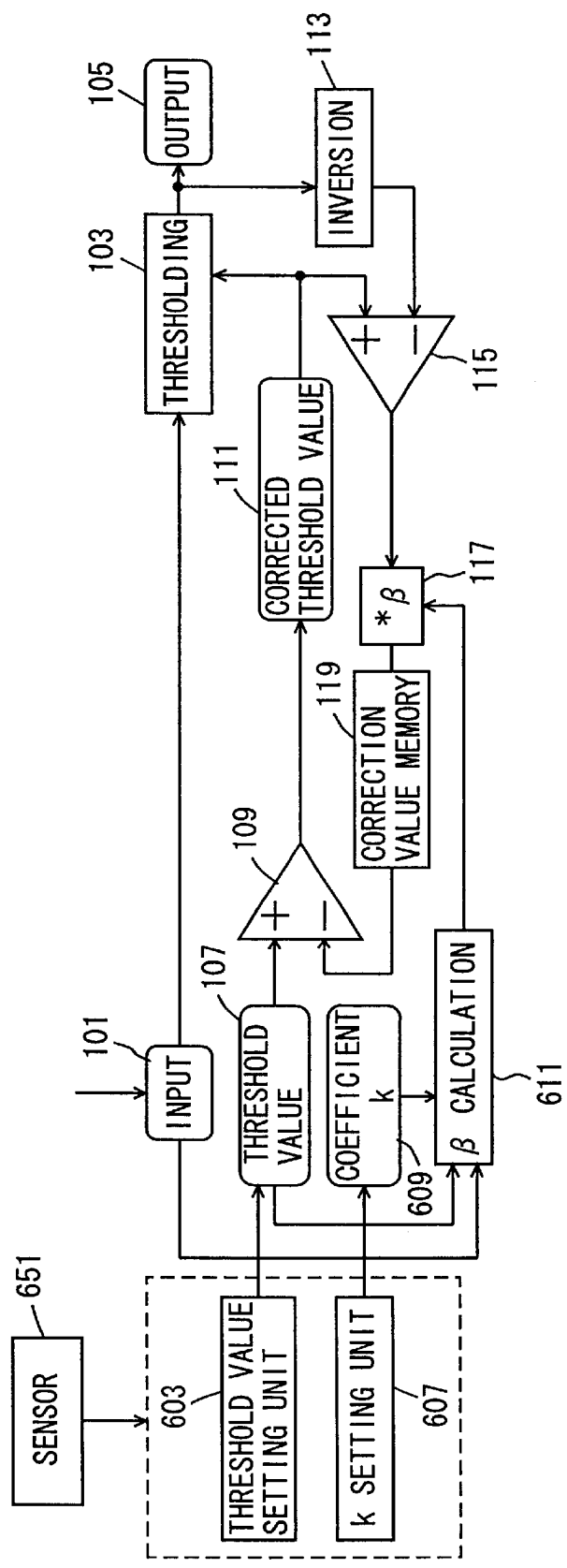
FIG. 42 is a block diagram of an image forming apparatus in accordance with a fifth embodiment of the present invention.

The setting performed by the initial threshold value th setting unit 603 and k setting unit 607 shown in FIG. 31 may be automatically performed based on the output of a sensor 651, as shown in FIG. 42. More specifically, an environmental value is detected by sensor 651, and the values th and k (or further, weight coefficient and β) are changed in accordance with the environmental value. Here, the environmental value refers to a value determined by temperature, power supply voltage, moisture, type of paper, image forming method, remaining amount of color material, type of color material, aging, photoreceptor, light emitting element and so on.

The γ characteristic of the image forming means changes generally in accordance with the environmental value. In order to compensate for the change in γ characteristic caused by the change in the environmental value, the values th, k, β and weight coefficient are changed. In place of detection of the environmental value, the output from output unit 105 may be directly detected.

Sixth Embodiment

Figure 43:
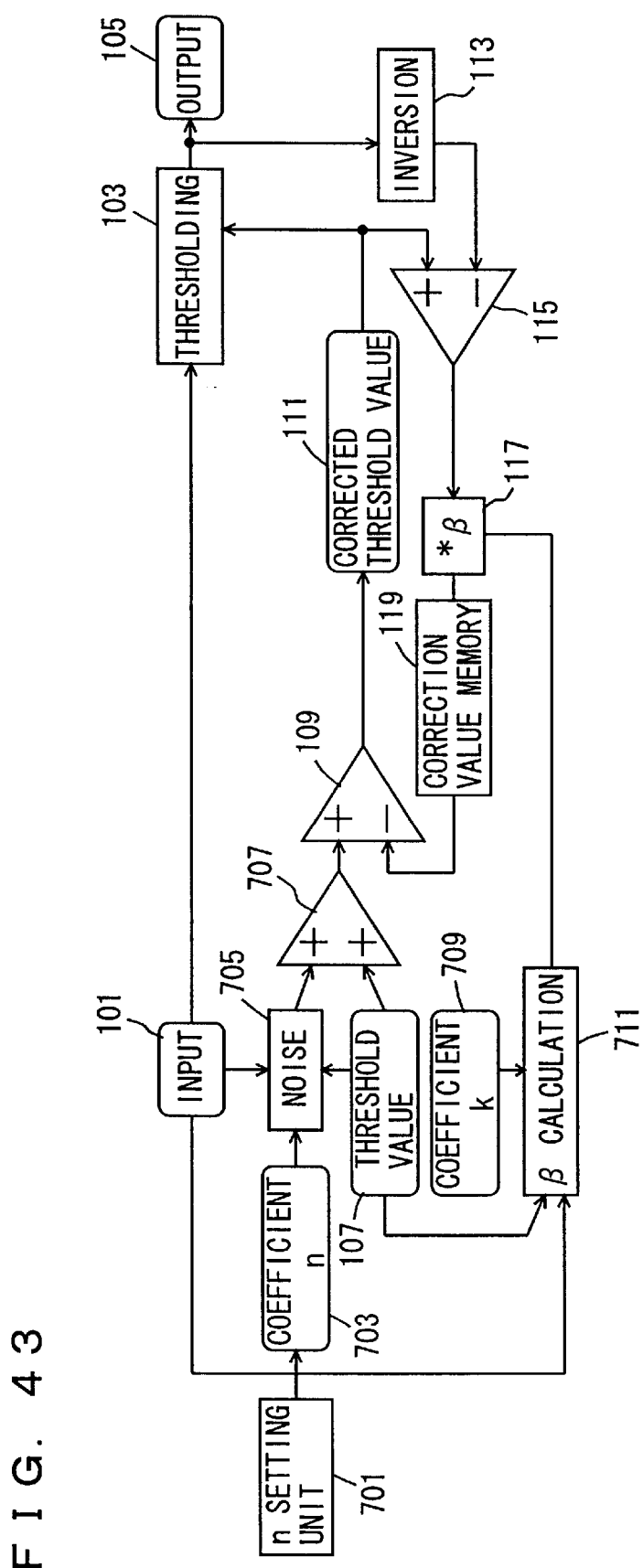
FIG. 43 is a block diagram representing a configuration of the image forming apparatus in accordance with a sixth embodiment of the present invention.

FIG. 43 is a block diagram representing a configuration of an image forming apparatus in accordance with the sixth embodiment of the present invention. Referring to the figure, the image forming apparatus includes, as in the first embodiment, an input unit 101, a thresholding unit 103, a binary image output unit 105, an inverting unit 113, an initial threshold value generating unit 107, a subtracting unit 109, a corrected threshold value output unit 111, a subtracting unit 115, a coefficient multiplying unit 117 and a correction value memory 119.

In accordance with the present embodiment, the image forming apparatus further includes an n setting unit 701 setting maximum value of noise level (coefficient n), a coefficient n output unit 703 outputting coefficient n, a noise generating unit 705 generating noise based on the input value, coefficient n and the initial threshold value th, and an adding unit 707 adding the initial threshold value th to the noise.

As in the fourth embodiment, the image forming apparatus includes coefficient k output unit 709, and β calculating unit 701 calculating β for each pixel based on the input value, initial threshold value th and coefficient k.

Figure 44:
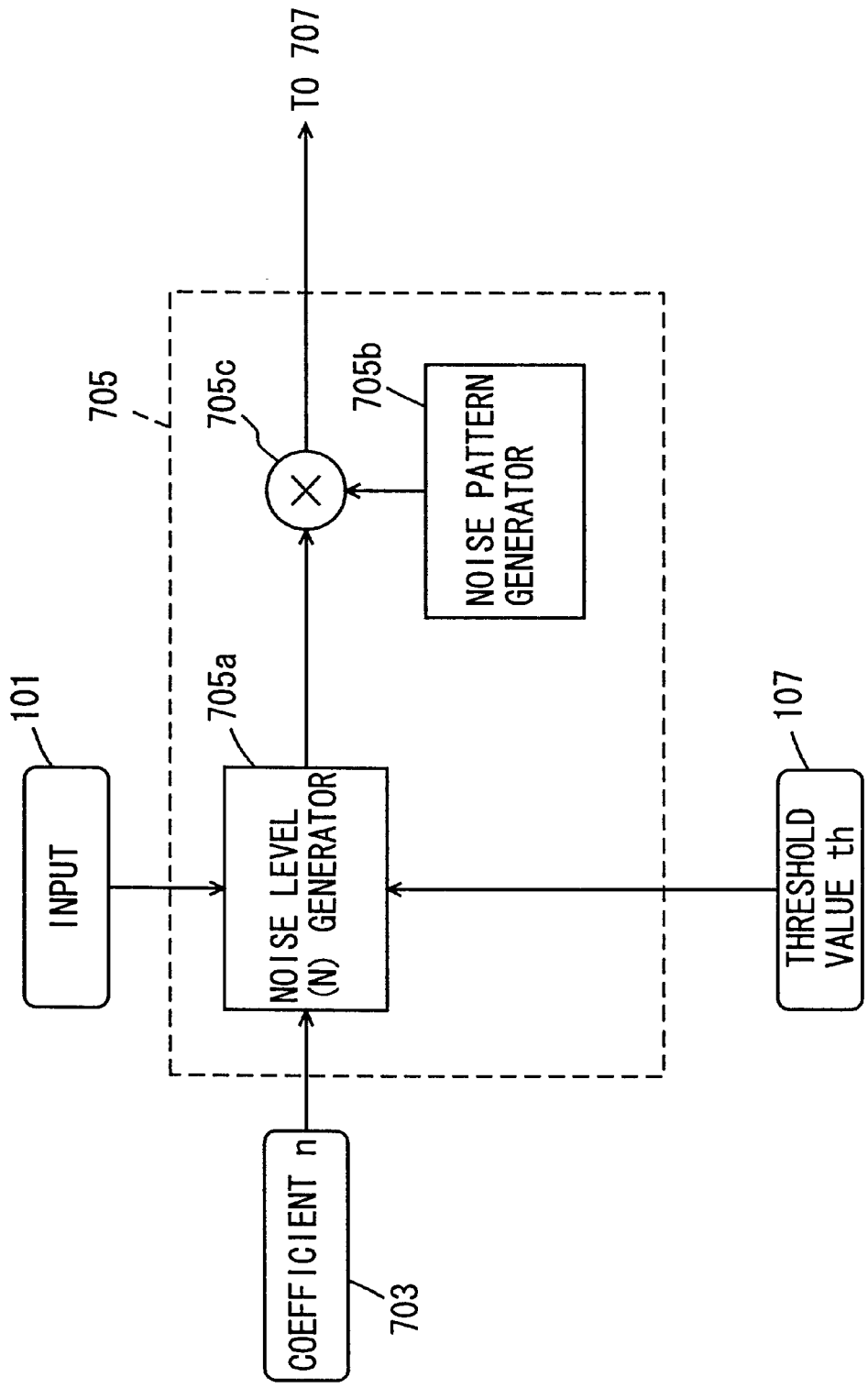
FIG. 44 is a block diagram representing a configuration of a noise generating unit 705.

FIG. 44 is a block diagram representing a configuration of noise generating unit 705 shown in FIG. 43.

Referring to the figure, noise generating unit 705 includes a noise level generator 705A for generating noise level (N) based on input value, coefficient n and initial threshold value th, a noise pattern generator 705b generating a periodic noise pattern, and a multiplier 705c multiplying an output from noise level generator 705a by an output from noise pattern generator 705b.

Figure 45:
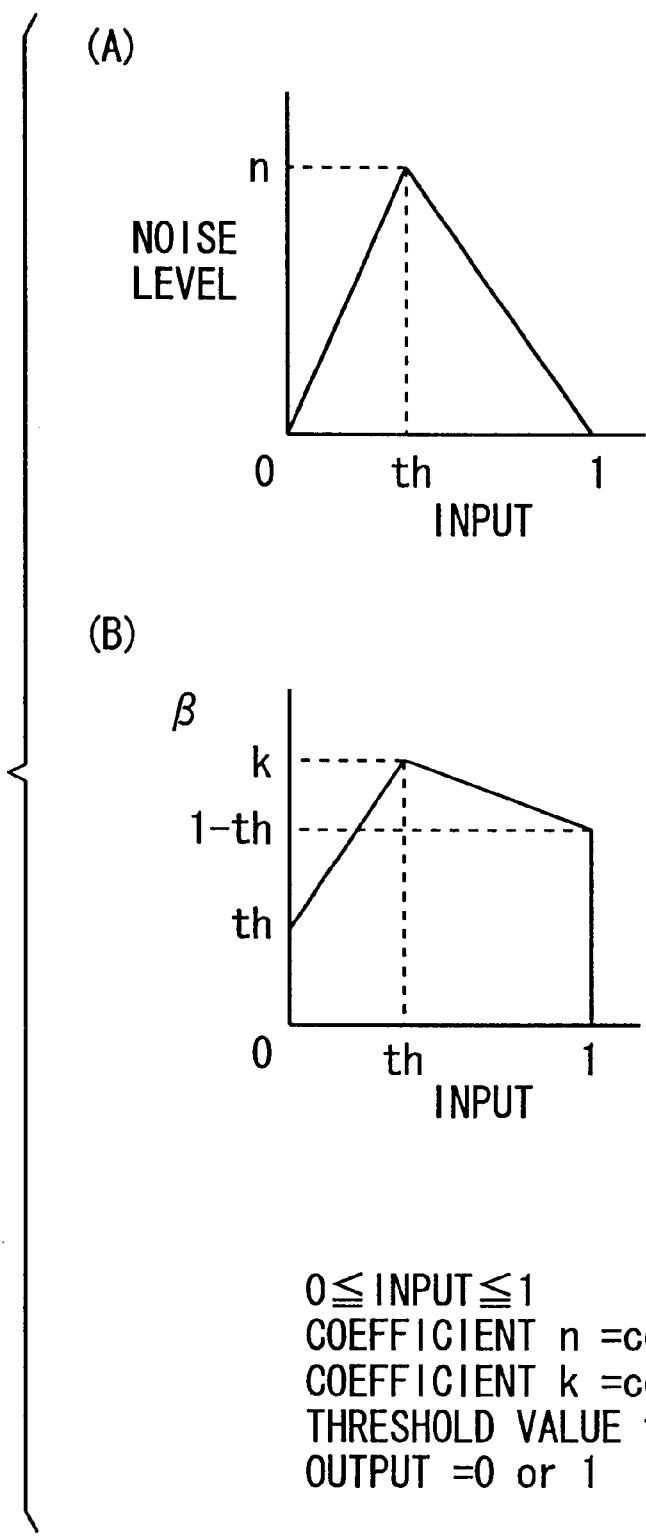
FIG. 45 represents processes in the noise generating unit and a β calculating unit.

FIG. 45(A) represents the process in the noise generating unit 705, and (B) represent the process in β calculating unit 701.

As can be seen from FIG. 45(A), when the input value is 0, the noise level attains to 0, when the input value is th, it attains to n, and when the input value is 1, it attains to 0.

The process of β calculating unit 701 of FIG. 45(B) is the same as in the fourth embodiment, and therefore, description is not repeated.

Figure 50:
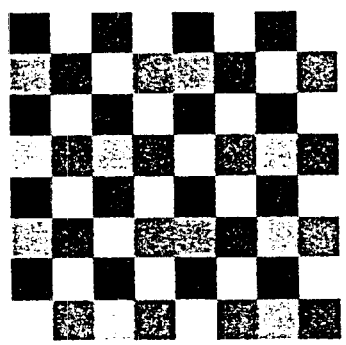
Figure 51:

FIGS. 46 to 51 represent specific examples of the patterns output from noise pattern generator 705b. FIGS. 46 to 49 are centralized dither patterns, FIG. 50 is a dispersed dither pattern, and FIG. 51 is a line pattern.

Such patterns may be stored in a memory in advance, or the patterns may be calculated based on the information of pixel positions. By adding such a regular pattern to the threshold value, the image quality of the output image can be improved.

More specifically, the threshold value diffusion method has the problem that crystallization and texture shift are larger than in the error diffusion method (the dots tend to appear regularly in lattice shape than in the error diffusion method, so that texture shift is more noticeable), and the problem that the graph representing γ characteristic has unevenness, as can be seen from FIGS. 34 and 35. In the present embodiment, by the addition of the noise, these problems can be solved.

When image quality is to be improved by positively showing patterns, centralized dither pattern or line pattern is preferred. When the pattern should not be noticeable, a disperse type pattern may be preferred.

Effects of the Sixth Embodiment

Figure 52:
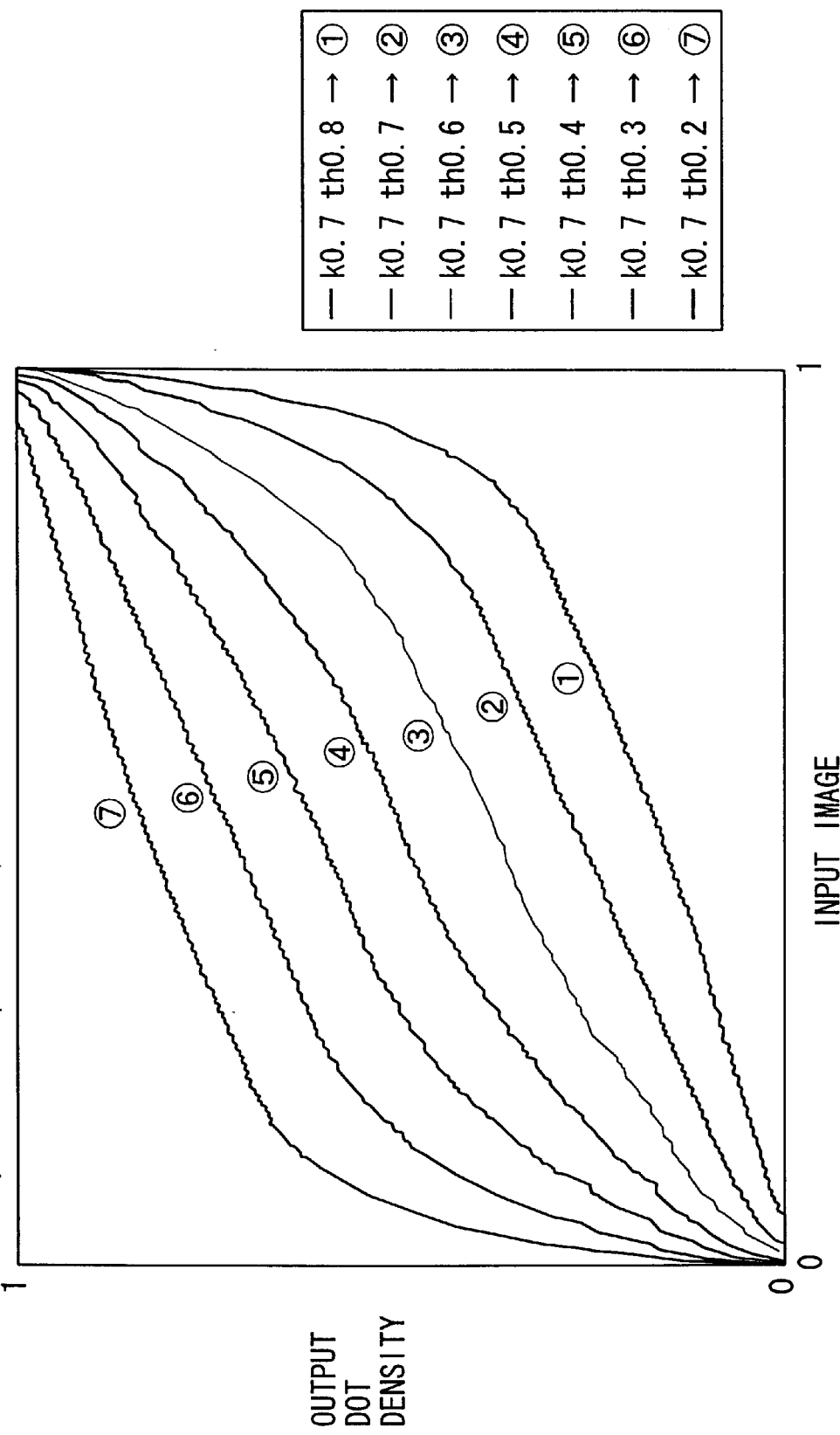
FIGS. 52 and 53 are graphs representing the effects attained by the sixth embodiment.
Figure 53:
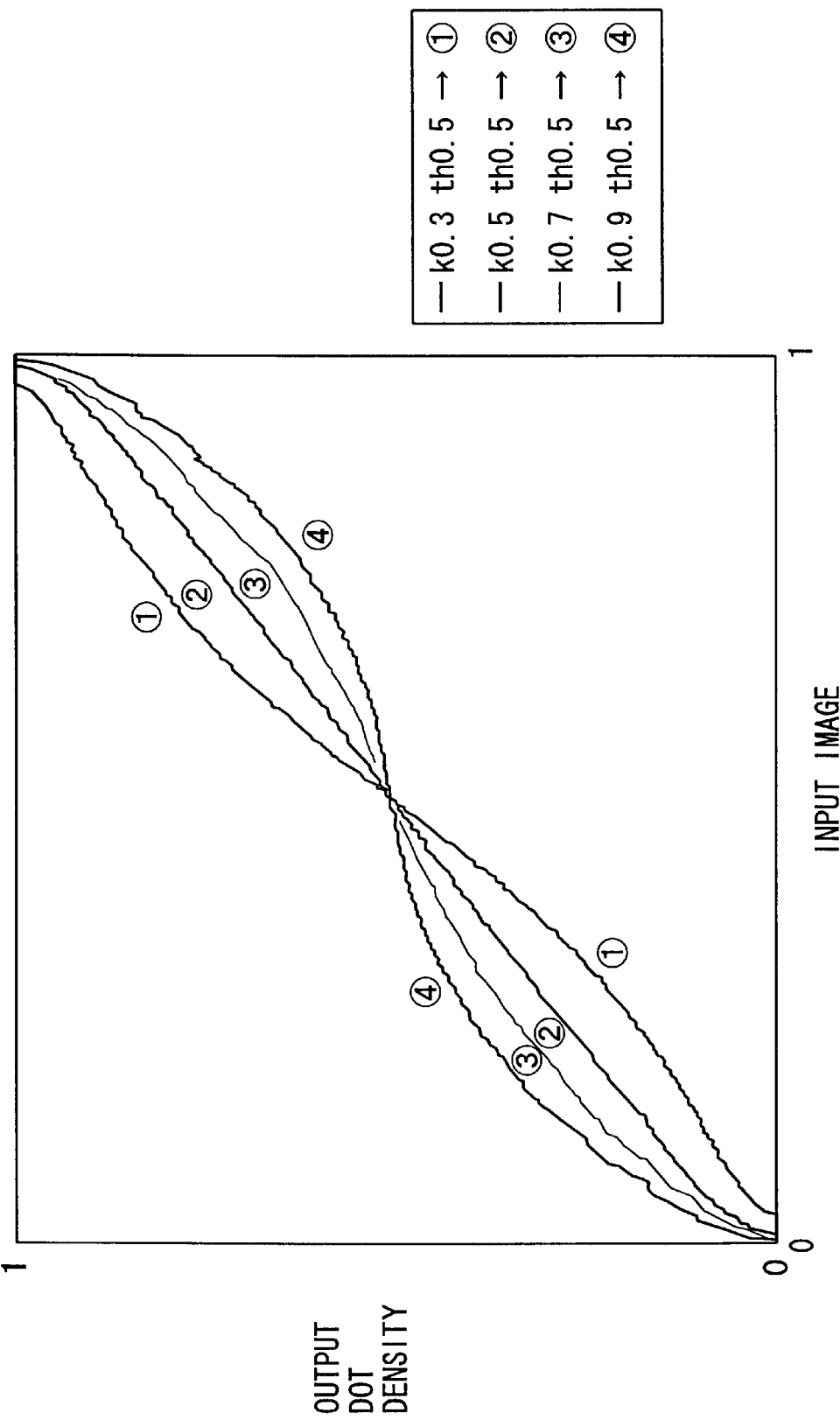

FIGS. 52 and 53 represent changes in γ characteristic when the coefficient k and initial threshold value th are changed, which correspond to FIGS. 34 and 35. Here, the coefficient n is set to 0.2.

As is apparent from the figure, by adding noise to the threshold value in the present embodiment, generation of unevenness on the curve representing the γ characteristic can be prevented.

Figure 54:
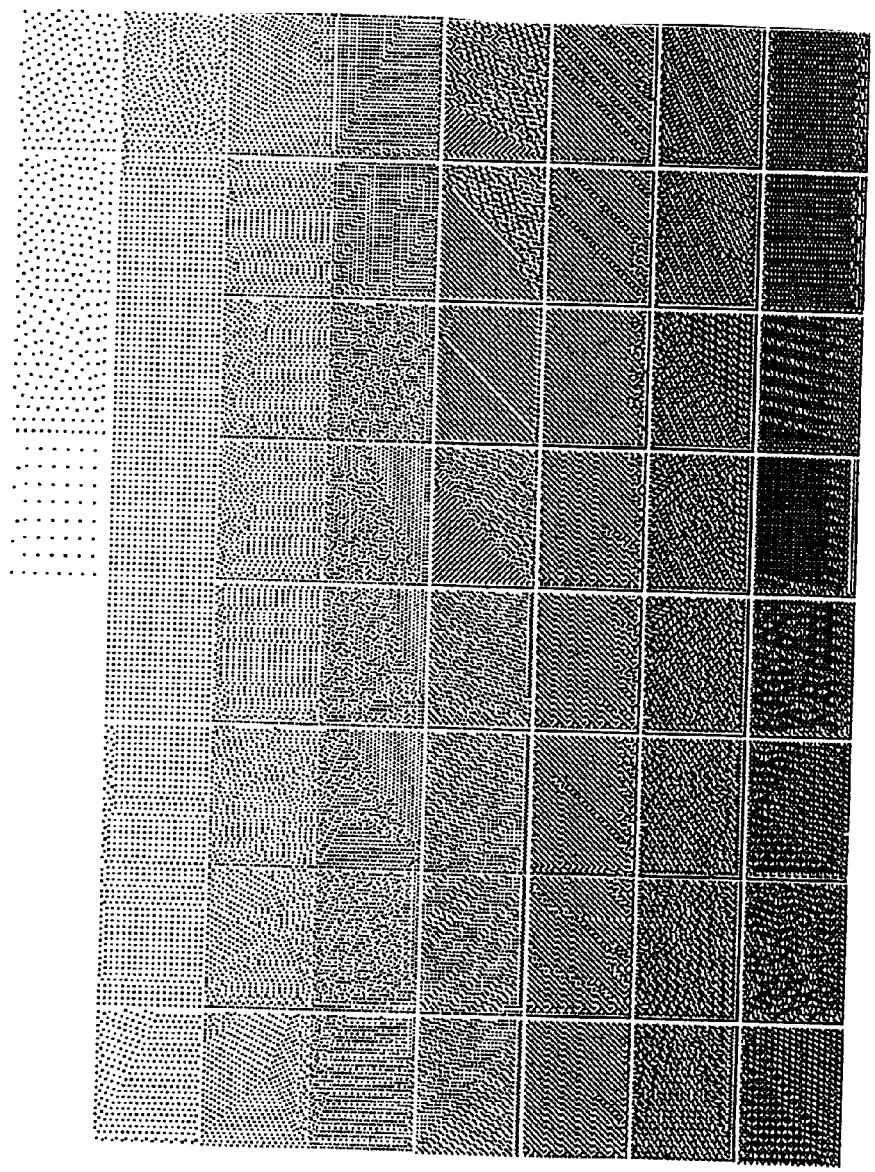
FIG. 54 represents an example of texture shift.

FIG. 54 shows a specific example of texture shift. In FIG. 1, one rectangle represents the result of binarization by threshold value diffusion method, of an original image of a constant density. As can be seen from the figure, patterns (texture shift) appear, because of the change in dot patterns in one rectangle.

Figure 46:
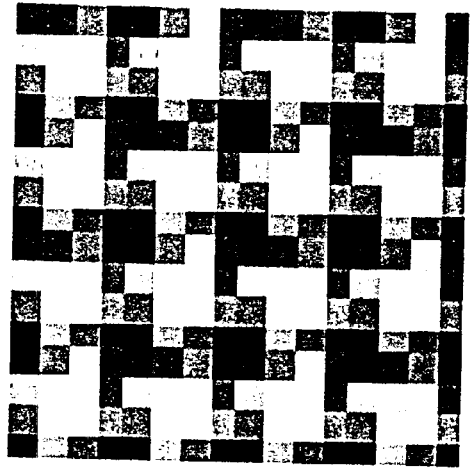
FIGS. 46 to 51 represent first to sixth examples of noise pattern.
Figure 47:
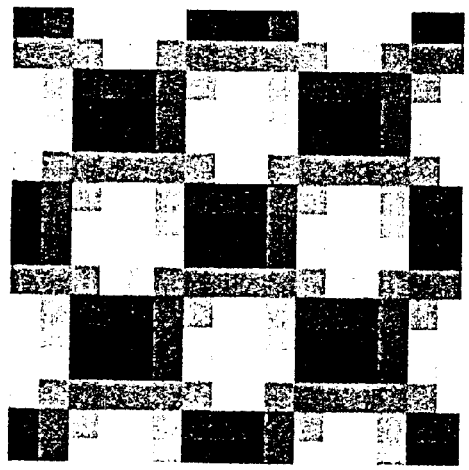
Figure 48:
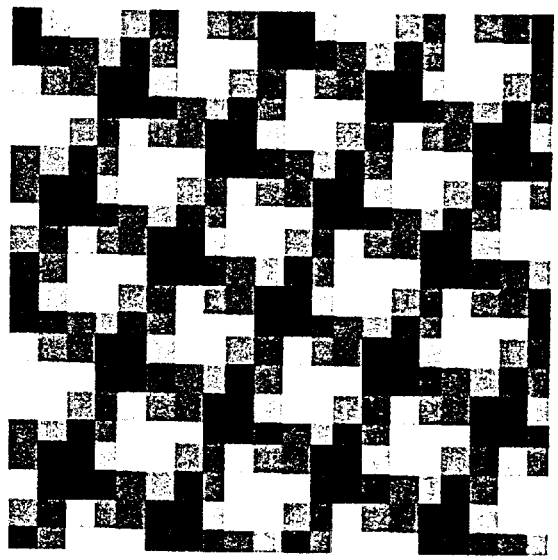
Figure 49:
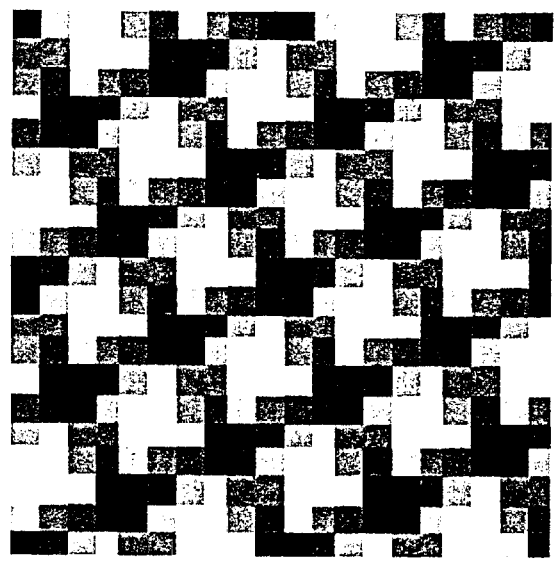
Figure 55:
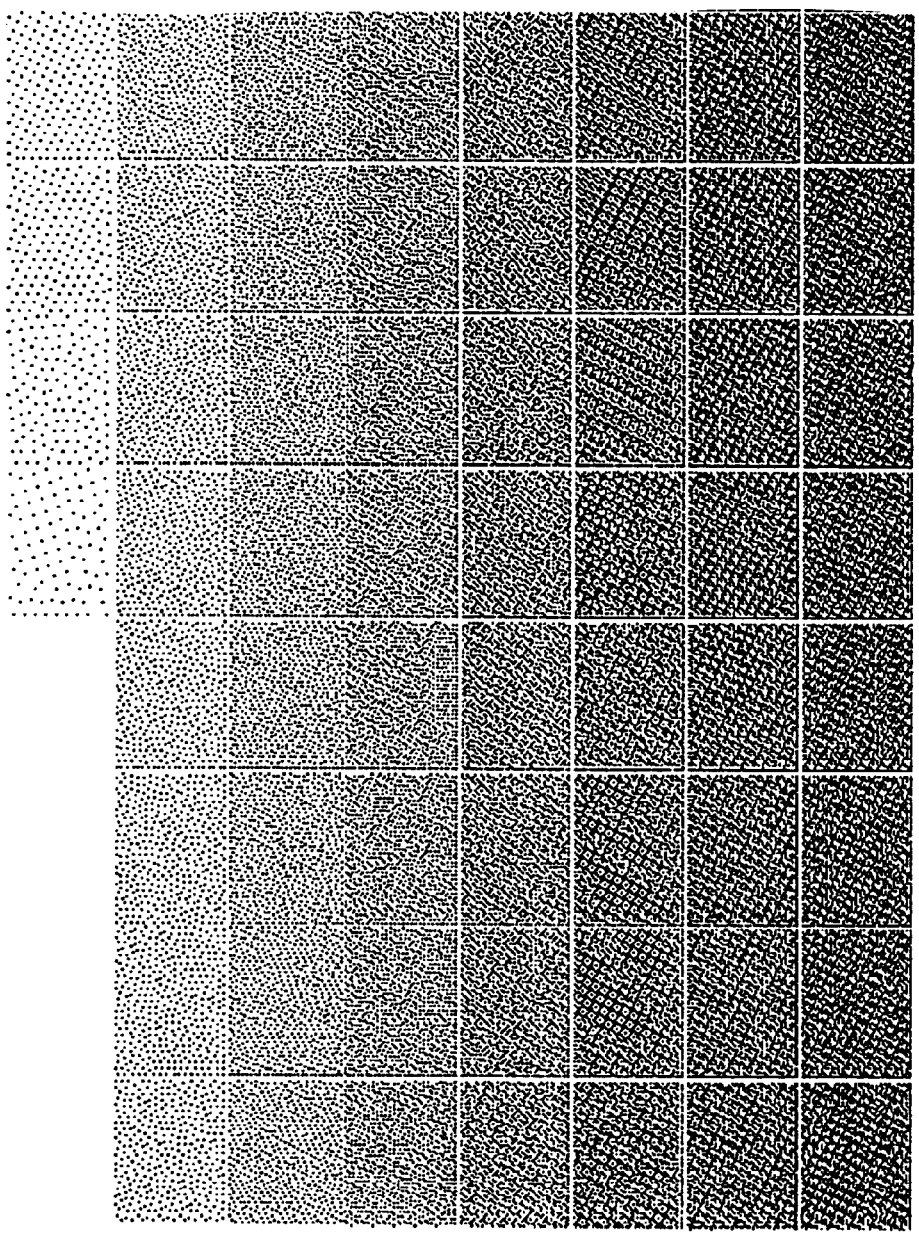
FIG. 55 represents a state where the pattern of FIG. 46 is added.
Figure 56:
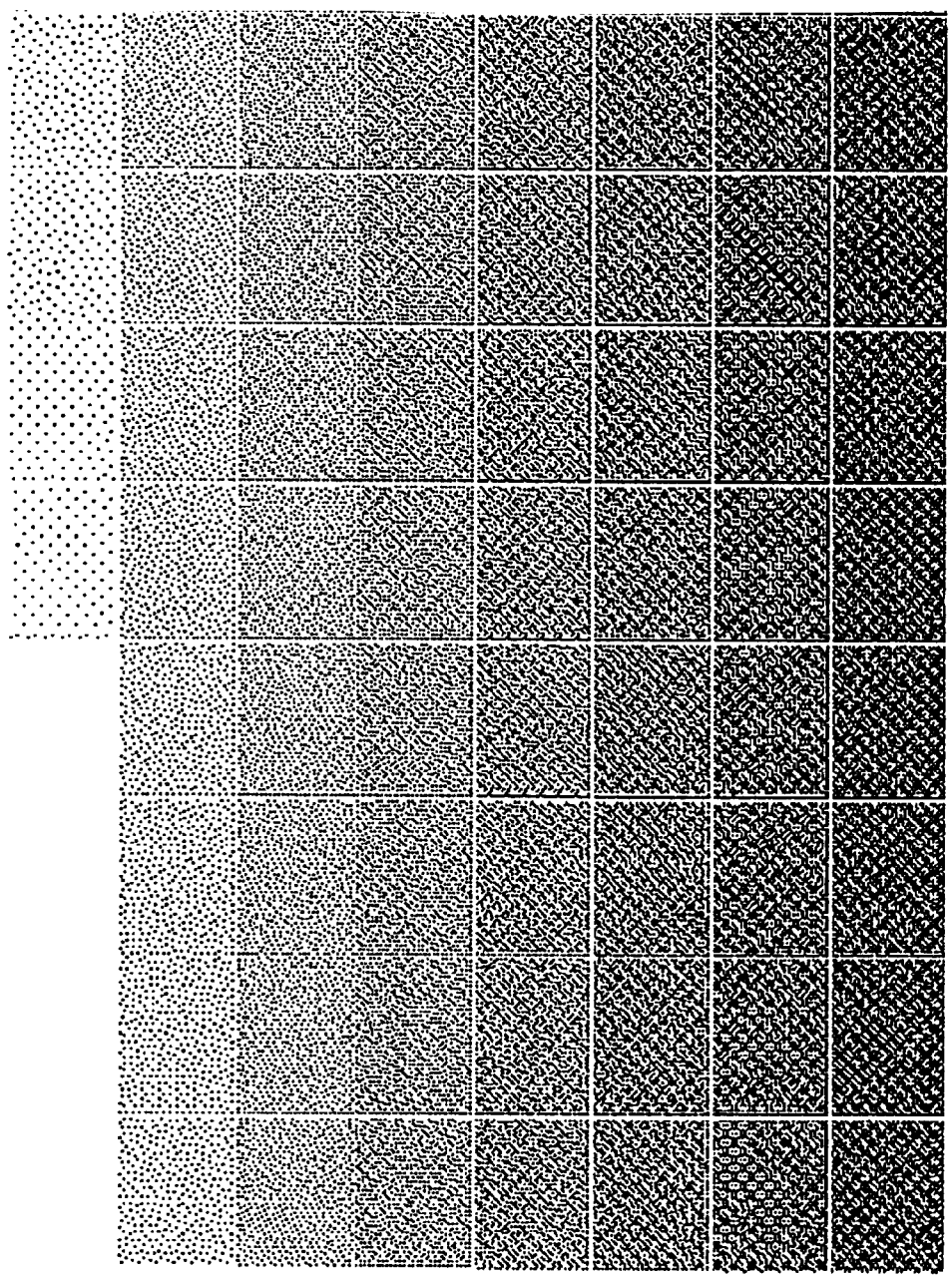
FIG. 56 represents a state where the pattern of FIG. 47 is added.
Figure 57:
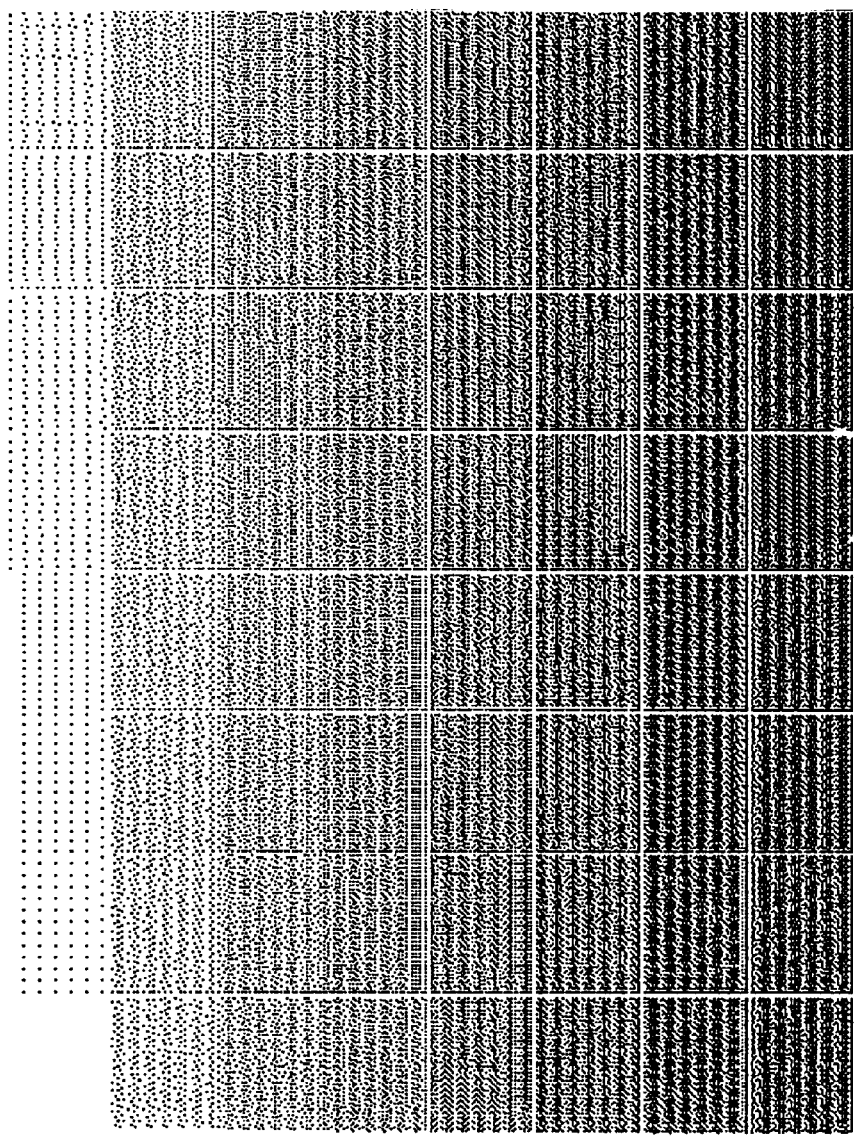
FIG. 57 represents a state where the pattern of FIG. 51 is added.

FIGS. 55, 56 and 57 represent results of image processing with the patterns of FIGS. 46, 47 and 51 added, in accordance with the present embodiment. As can be seen from the figures, in the present embodiment, generation of texture shift can be prevented.

Though periodic pattern is added as the noise in the above described embodiment, random noise may be added. Here, random noise refers to white noise, blue noise or pink noise, for example. White noise represents noise uniformly including all the frequency components, blue noise refers to the noise containing much high frequency component, and pink noise refers to the noise containing much low frequency component.

Figure 58:
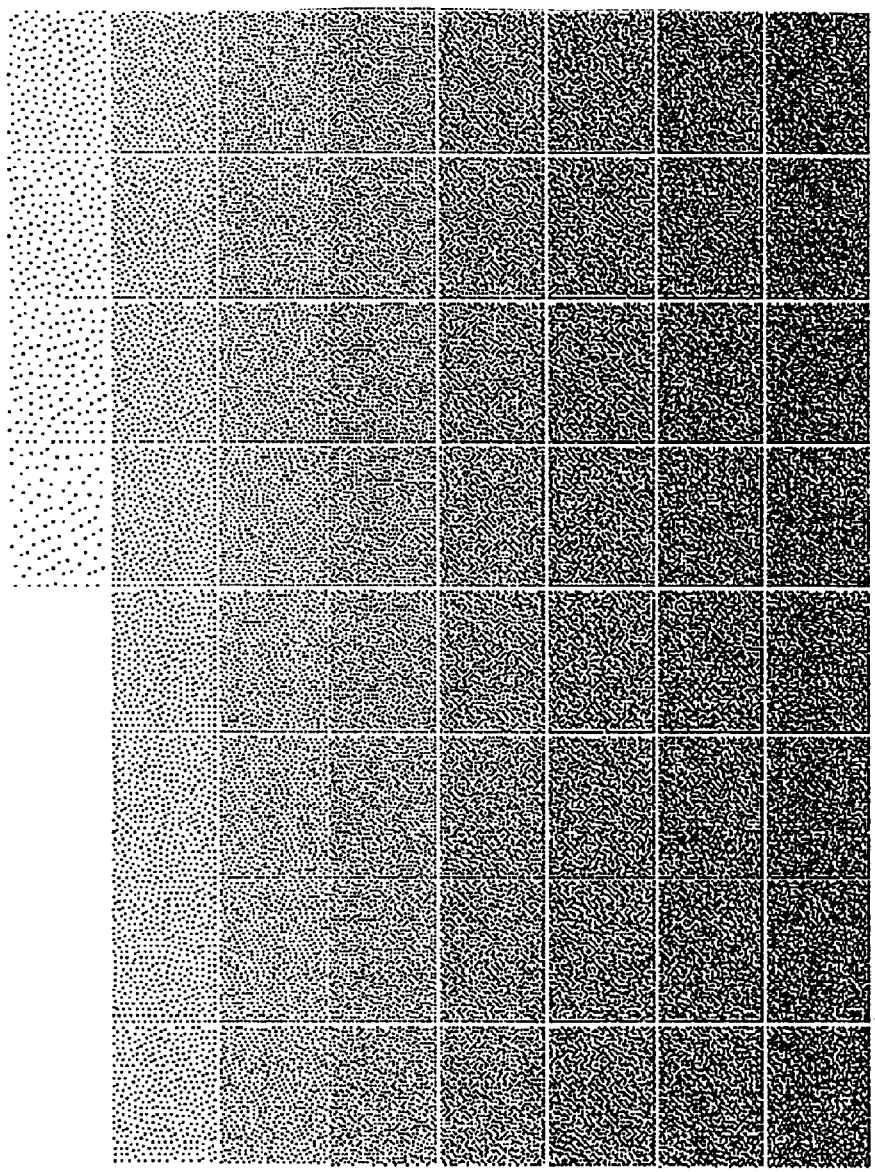
FIG. 58 shows an example where texture shift is improved by adding white noise.

FIG. 58 represents an example of improvement in texture shift attained by adding white noise to the original image corresponding to FIG. 54.

Most common noise is white noise, which can be generated easily. When resolution is of higher priority, use of blue noise is preferred to attain satisfactory result in general. When soft image quality is desired, use of pink noise is preferred.

Though noise is added to the threshold value in the above described embodiment, the noise may be added to any signal within the image forming apparatus, such as the feed back coefficient, weight coefficient, initial threshold value or the input value. Further, the noise may be provided by changing the range to which the threshold value is diffused, that is, by widening or narrowing the range.

Though the noise intensity is changed dependent on the input value in the present embodiment, the intensity and the pattern of the noise to be added may be varied based on the value within the threshold value diffusion algorithm (for example, the output value, the inverted output value, feed back value, initial threshold value, feed back coefficient and the like).

Further, the noise intensity or pattern of the noise to be added may be changed dependent on the color such as C, M, Y and K. More specifically, when a plurality of colors are superposed for printing, when same patterns exist on different colors, interference occurs, lowering image quality. Such a problem can be solved by adding different signal patterns, changing intensities, changing pattern angles or changing periods for respective colors.

Further, the intensity of the signal pattern or the pattern type to be added may be changed dependent on the image type. The image type refers to color/monochrome, image/text, natural image/graphic image and so on.

Further, the intensity and the pattern of the signal pattern to be added may be changed in accordance with the environmental value, which is based on the temperature, moisture, power supply voltage, remaining amount of color material, type of color material, aging, photoreceptor, light emitting element and so on.

This is because optimal value of the signal (noise) to be added differs dependent on the image type or the environmental value.

Output Samples

FIGS. 59 to 63 show results of printing of the image obtained by the threshold value diffusion method and the error diffusion method.

Figure 60:
Figure 61:
Figure 62:
FIG. 62 represents result of output in accordance with the error diffusion method.

FIGS. 59 to 61 and FIG. 63 represent the output results in accordance with the threshold value diffusion method, and FIG. 62 represents the result obtained through the error diffusion method.

Figure 59:
FIGS. 59 to 61 represent results of output in accordance with the threshold value diffusion method.
Figure 63:
FIG. 63 represents a result of output in accordance with the threshold value diffusion method.

In FIG. 59, the coefficients used in the threshold value diffusion method are k=0.9, th=0.7 and n=0.2, in FIG. 60, k=0.9, th=0.75, n=0.2, in FIG. 61, k=0.9, th=0.8 and n=0.2, and in FIG. 63, k=0.9, th=0.7 and n=0.2. The laser printer used for printing these images is such a printer that exhibits the characteristic of FIG. 36(A).

As can be seen from the results of output, when the error diffusion method is used (FIG. 62), the image is black and too dense, while satisfactory images can be obtained through the threshold value diffusion method.

Seventh Embodiment

The first to sixth embodiments are directed to binarization of a multi-value image. The seventh embodiment is for multi-value processing in accordance with the threshold value diffusion method. Here, the multi-value processing refers to a process of converting an input multi-value image of 256 gradations, for example, to a multi-value image of four gradations, for example, that is, to a smaller number of gradations.

Figure 64:
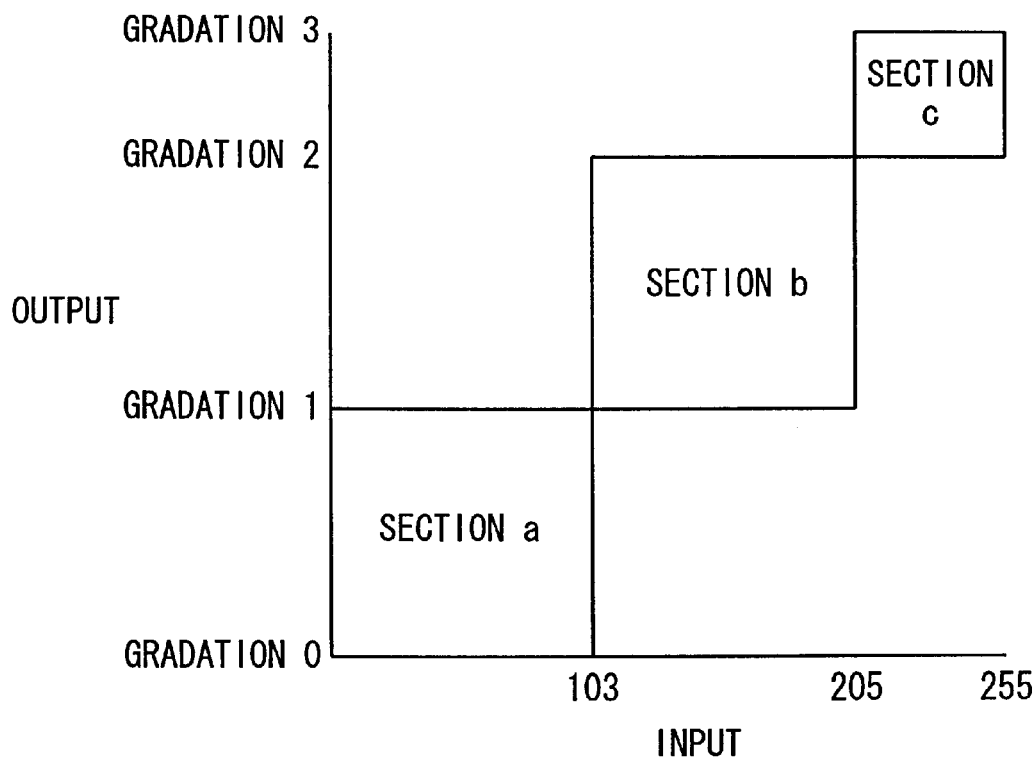
FIG. 64 represents processing in a seventh embodiment of the present invention.

Basic concept of multi-value processing will be described. FIG. 64 is a graph related to the conversion of an input image of 256 gradations to an output image of four gradations. In FIG. 64, the input image is divided into three sections, and for each section, binarization utilizing the threshold value diffusion method is performed. More specifically, in section a, threshold value diffusion outputting two gradations, that is, gradation 0 and gradation 1 is performed, in section b, threshold diffusion outputting two gradations of gradation 1 and gradation 2 is performed, and in section c, threshold diffusion outputting two gradations of gradation 2 and gradation 3 is performed. By the binarization utilizing the threshold value diffusion method section by section, the input image of 256 gradations is converted to an output image of four gradations from gradation 0 to gradation 3. The boundary value utilized for assignment (sectioning) is determined in accordance with the output gradation. For example, when the output gradation is four gradations of 0, 0.4, 0.8 and 1, the input image is assigned to three sections of 0 to 102 (=255*0.4), 103 to 204 (255*0.8) and 205 to 255.

Figure 65:
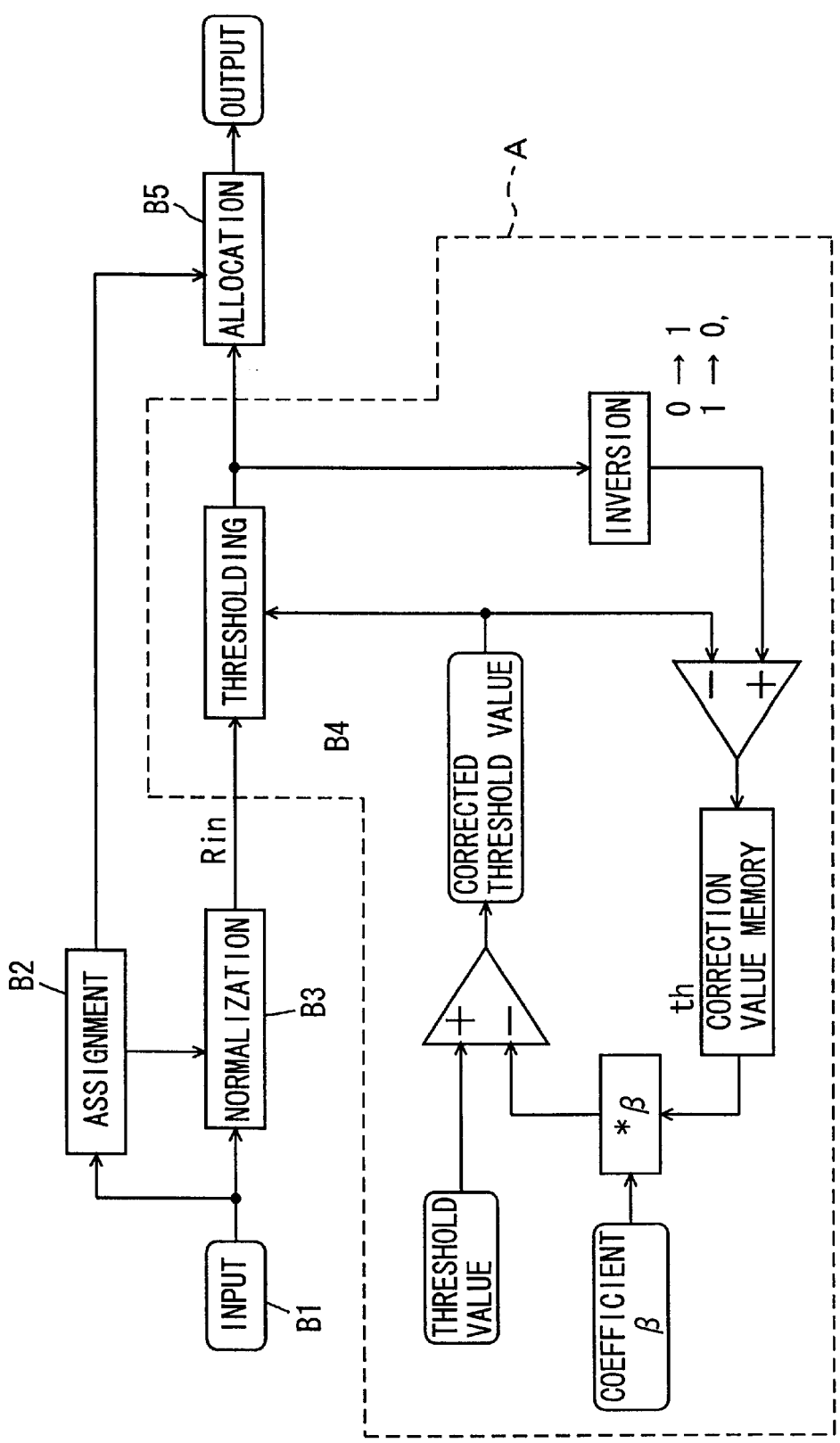
FIG. 65 is a block diagram representing configuration of the image forming apparatus in accordance with the seventh embodiment.

FIG. 65 is a block diagram representing a configuration of an image forming apparatus in accordance with the present embodiment. In the figure, the portion surrounded by a dotted line A represents a portion performing binarization in accordance with the threshold value diffusion method, and other portions perform assignment of input image and allocation of output gradation. The binarizing portion utilizes similar configuration as those of the first to sixth embodiments, and therefore, description is not repeated. As in the above described embodiments, the threshold value Th (x), and feed back coefficient β can be manually or automatically changed. Configuration other than the binarizing portion will be described in the following.

First, a multi-value image (0~1) is input to input unit B1. For example, for an image of 256 gradations, normalized value normalized to 0/255 to 255/255 is input. The input image is assigned to three sections in accordance with the input gradation, by the assignment unit B2. More specifically, when the input image is 0 to 102/255, it is assigned to section a, when the input image is 103/255 to 204/255, it is assigned to section b, and when the input image is 205/255 to 255/255, it is assigned to section c. In the normalizing unit B3, a value Rin obtained by normalizing the input image to 0 to 1 in respective sections in accordance with the result of assignment by assigning unit B2 is output.

The thresholding unit B4 performs normal binarization on the normalized value Rin, in which "1" is output when Rin≧threshold value Th (x), and "0" is output when Rin<threshold value Th (x). In the allocating unit B2, based on the result of assignment of assigning unit B2 and the result of binarization of binarizing unit B4, allocation of output gradation is performed. More specifically, when the input image is in section a and the result of binarization is 0, gradation 0 is allocated, and when the binarization result is 1, gradation 1 is allocated. When the input image is in section b and the result of binarization is 0, gradation 1 is allocated and if the result of binarizaiton is 1, the gradation 2 is allocated. When the input image is in section c and the result of binarization is 0, gradation 2 is allocated and if the result of binarization is 1, gradation 3 is allocated. In this manner, by binarization section by section, it becomes possible to convert an input image of 256 gradations to an output image of four gradations.

Though conversion from an input image of 256 gradations to an output image of four gradations only is described above, conversion of an arbitrary input gradation to an arbitrary output gradation is possible by the similar method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus converting a first image signal representing a density level of a pixel in a prescribed number of gradations to a second image signal representing the density level of the pixel in a smaller number of gradations than said prescribed number, comprising:
   a converter successively receiving as inputs first image signals of pixels, comparing a density level of each pixel with a prescribed threshold value and converting to second image signals; and
   a feed back circuit correcting said prescribed threshold value to be used for subsequent conversion of pixels, based on a signal level of the second image signals output from said converter and said threshold value.

2. The image processing apparatus according to claim 1, wherein said feed back circuit includes control means for controlling a feed back value in said feed back circuit.

3. The image processing apparatus according to claim 2, wherein said control means includes a feed back coefficient setter for setting a feed back coefficient.

4. The image processing apparatus according to claim 3, wherein said feed back coefficient setter is capable of changing the feed back coefficient.

5. The image processing apparatus according to claim 4, wherein said feed back coefficient setter sets a feed back coefficient which changes in accordance with the density level of each pixel converted by said converter.

6. The image processing apparatus according to claim 5, wherein
   said feed back coefficient setter includes
   a calculating unit for calculating the feed back coefficient based on a prescribed relation between the feed back coefficient and each density level of each pixel converted by said converter, and
   means for changing the prescribed relation used in said calculating unit.

7. The image processing apparatus according to claim 4, wherein said first image signal has a plurality of color components, and
   said feed back coefficient setters sets the feed back coefficient which changes in accordance with the color component of the image signal converted by said converter.

8. The image processing apparatus according to claim 1, wherein
   said feed back circuit includes a correction value memory for diffusing a feed back value of said feed back circuit to a plurality of peripheral pixels to be converted subsequently, in accordance with a weight set for each of the peripheral pixels.

9. The image processing apparatus according to claim 8, wherein said weight is variable.

10. The image processing apparatus according to claim 1, further comprising a threshold value generating unit generating a value which changes for conversion of each pixel, as said prescribed threshold value.

11. The image processing apparatus according to claim 10, wherein said threshold value generating unit changes said prescribed threshold value in accordance with a position of a pixel to be converted.

12. The image processing apparatus according to claim 10, wherein said threshold value generating unit changes said prescribed threshold value in accordance with the density level of the pixel to be converted.

13. The image processing apparatus according to claim 10, wherein said first image signal has a plurality of color components, and
said threshold value generating unit changes said prescribed threshold value in accordance with the color component of the pixel to be converted.

14. The image processing apparatus according to claim 1, further comprising a multiplier provided in a preceding stage of said converter, multiplying the density level of each pixel converted by said converter by a prescribed coefficient.

15. The image processing apparatus according to claim 14, wherein said prescribed coefficient is variable.

16. The image processing apparatus according to claim 1, wherein a gradation characteristic representing a relation between the density level of said first image signal and the density level of the second image signal after conversion is adjusted by changing at least one of said prescribed threshold value and feed back coefficient.

17. The image processing apparatus according to claim 16, wherein gradation characteristic with respect to maximum and minimum levels of said first image signal is fixed, and gradation characteristic of an intermediate level between the maximum and minimum levels is adjusted by changing at least one of said prescribed threshold value and the feed back coefficient.

18. The image processing apparatus according to claim 1, wherein a signal component not related to said first image signal to be converted is superposed on any of signals in said image processing apparatus.

19. The image processing apparatus according to claim 18, wherein said signal component to be superposed represents a periodic pattern.

20. The image processing apparatus according to claim 19, wherein said periodic pattern is any of a dispersed dither pattern, a concentrated dither pattern and a line pattern.

21. The image processing apparatus according to claim 18, wherein said signal component to be superposed is random noise.

22. The image processing apparatus according to claim 21, wherein said random noise is any of white noise, blue noise and pink noise.

23. The image processing apparatus according to claim 1, wherein said feed back circuit feeds back a difference between an inverted value of the signal level of said second image signal output from said converter and said threshold value.

24. A method of image processing for converting a first image signal representing a density level of a pixel in a prescribed number of gradations to a second image signal representing the density level of the pixel in a smaller number of gradations than said prescribed number, comprising:
   a converting step of successively receiving as inputs the first image signals of pixels, comparing a density level of each pixel with a prescribed threshold value and converting to second image signals; and
   a feed back step of correcting said prescribed threshold value to be used in subsequent conversion of pixels, based on a signal level of said second image signals output from said conversion step and said threshold value.

25. The method of image processing according to claim 24, wherein said feed back step includes a step of controlling a feed back value in said feed back step.

26. The method of image processing according to claim 24, further comprising a threshold value generating step of generating a value which changes for conversion of each pixel as the prescribed threshold value.

27. The method of image processing according to claim 24, wherein a gradation characteristic representing a relation between the density level of said first image signal and the density level of said second image signal after conversion is adjusted by changing at least one of said prescribed threshold value and a feed back coefficient.

28. The method of image processing according to claim 27, wherein gradation characteristic for maximum and minimum levels of said first image signal is fixed, and gradation characteristic of an intermediate level between the maximum and minimum levels is adjusted by changing at least one of said prescribed threshold value and the feed back coefficient.

29. An image processing apparatus converting a first image signal representing a density level of a pixel in a prescribed number of gradations to a second image signal representing the density level of the pixel in a smaller number of gradations than said prescribed number, comprising:

an assignment circuit successively receiving as inputs first image signals of pixels and assigning the first image signals to sections corresponding to a number of gradations of second image signals;

a normalizing circuit normalizing said first image signals within the section assigned by said assignment circuit;

a comparator successively receiving the first image signals normalized by said normalizing circuit and comparing a signal level of each pixel with a prescribed threshold value;

a feed back circuit correcting said prescribed threshold value to be used for subsequent conversion of pixels, based on a result of comparison output from said comparator and said prescribed threshold value; and an allocating circuit allocating a gradation level of the second image signals to each pixel, in accordance with the result of comparison output from said comparator and the section assigned by said assignment circuit.

30. The image processing apparatus according to claim 29, wherein said feed back circuit includes control means for controlling a feed back value in said feed back circuit.

31. The image processing apparatus according to claim 29, wherein said feed back circuit includes a correction value memory for dispersing a feed back value of said feed back circuit to a plurality of peripheral pixels to be converted subsequently, in accordance with a weight set for each of the peripheral pixels.

32. The image processing apparatus according to claim 29, further comprising a threshold value generating unit generating a value which changes for conversion of each pixel as the prescribed threshold value.

33. An image processing apparatus converting a first image signal representing a density level of a pixel in a prescribed number of gradations for each of a plurality of color components, to a second image signal representing the density level of the pixel in a smaller number of gradations than said prescribed number, comprising a plurality of image processing units provided for respective color components, wherein
  each of the image processing units includes
  a converter successively receiving as inputs the first image signals of pixels, comparing a density level of each pixel with a prescribed threshold value and converting to second image signals, and
  a feed back circuit correcting said prescribed threshold value to be used in subsequent conversion of pixels, based on a signal level of the second image signals output from said converter and said threshold value.

34. The image processing apparatus according to claim 33, wherein said feed back circuit includes control means for controlling a feed back value in said feed back circuit, and said feed back value differs color component by color component.

35. The image processing apparatus according to claim 33, wherein said image processing unit uses a prescribed threshold value which is different color component by color component.

* * * * *